United States Patent
Dovel

(10) Patent No.: US 9,738,129 B2
(45) Date of Patent: Aug. 22, 2017

(54) VEHICLE ASSEMBLY FOR PROPULSION OVER WATER AND LAND

(71) Applicant: Andrew Raymond Dovel, Glenn Dale, MD (US)

(72) Inventor: Andrew Raymond Dovel, Glenn Dale, MD (US)

( * ) Notice: Subject to any disclaimer, the term of this patent is extended or adjusted under 35 U.S.C. 154(b) by 0 days.

(21) Appl. No.: 15/337,431

(22) Filed: Oct. 28, 2016

(65) Prior Publication Data

US 2017/0043637 A1    Feb. 16, 2017

Related U.S. Application Data

(63) Continuation-in-part of application No. 15/008,254, filed on Jan. 27, 2016, now Pat. No. 9,481,219.
(Continued)

(51) Int. Cl.
*B63H 16/18* (2006.01)
*B60F 3/00* (2006.01)
(Continued)

(52) U.S. Cl.
CPC ............ *B60F 3/0007* (2013.01); *B60F 3/003* (2013.01); *B60F 3/0038* (2013.01);
(Continued)

(58) Field of Classification Search
CPC ........... B63H 16/18; B63H 1/32; B63H 16/12
See application file for complete search history.

(56) References Cited

U.S. PATENT DOCUMENTS

| 515,682 A | 2/1894 | Hoeft |
| 1,438,688 A | 12/1922 | Bennik |

(Continued)

FOREIGN PATENT DOCUMENTS

| CN | 203767057 U | 8/2014 |
| ES | 2550373 A | 11/2015 |

(Continued)

OTHER PUBLICATIONS

Aqua Elliptica, http://studioaram.com/portfolio/aqualiptica/, Printed Jan. 26, 2016, 4 pages.
(Continued)

*Primary Examiner* — Edwin Swinehart
(74) *Attorney, Agent, or Firm* — Dickinson Wright PLLC

(57) ABSTRACT

A vehicle (20) consisting of a frame (22) with a pair of paddles (72) extending longitudinally and rotatably supported by the frame (22) in pendulum fashion for swinging movement between an extended position engaging the surface and a retracted position moved vertically out of engagement with the surface. A pair of foot platforms (74) are operatively connected to the paddles (72). A pair of depressors (84) interconnects the foot platforms (74) and the paddles (72) to rotate the paddles (72) between the extended position and the retracted position. The paddles (72) include a propulsion bar (86) and an oar (88) connected by a lost-motion connection to slide relative to one another between the extended position and the retracted position. The oars (88) have a fin-shape to propel the vehicle (20) over water and include a striker (90) to propel the vehicle (20) over land. The vehicle (20) allows movement over a surface of water and land using an elliptical motion similar to the natural motion of walking.

22 Claims, 16 Drawing Sheets

Related U.S. Application Data

(60) Provisional application No. 62/108,989, filed on Jan. 28, 2015.

(51) Int. Cl.
  *B63H 16/04* (2006.01)
  *B63H 16/08* (2006.01)
  *B63C 13/00* (2006.01)

(52) U.S. Cl.
  CPC ............ *B60F 3/0069* (2013.01); *B63C 13/00* (2013.01); *B63H 16/04* (2013.01); *B63H 16/08* (2013.01); *B63H 16/18* (2013.01)

(56) References Cited

U.S. PATENT DOCUMENTS

| | | |
|---|---|---|
| 3,614,939 A | 10/1971 | Dib |
| 4,353,703 A | 10/1982 | D'Elloy |
| 6,595,813 B1 | 7/2003 | Lekhtman |
| 7,785,161 B2 | 8/2010 | Wilkinson |
| 8,167,667 B2 | 5/2012 | Sturm |
| 8,668,536 B1 * | 3/2014 | Burnham ................ B63H 1/36 440/15 |
| 9,051,038 B1 | 6/2015 | Herber |
| 9,403,585 B2 * | 8/2016 | Arad ........................ B63H 5/15 |
| 2016/0059945 A1 | 3/2016 | Arad |

FOREIGN PATENT DOCUMENTS

| | | |
|---|---|---|
| WO | WO 2005/054051 A1 | 6/2005 |
| WO | WO 2009/141673 A1 | 11/2009 |

OTHER PUBLICATIONS

International Search Report and Written Opinion dated Apr. 29, 2016 that issued in PCT Application No. PCTUS2016/15142.

* cited by examiner

VEHICLE ASSEMBLY FOR PROPULSION OVER WATER AND LAND

CROSS REFERENCE TO RELATED APPLICATION

This application is a continuation-in-part of U.S. patent application Ser. No. 15/008,254, filed Jan. 27, 2016, which claims the benefit of provisional application Ser. No. 62/108,989, filed Jan. 28, 2015, the entire contents of which are incorporated herein by reference.

BACKGROUND OF THE INVENTION

1. Field of the Invention

The present invention relates generally to a vehicle powered by the feet of a human for movement over a surface of water and land.

2. Description of the Prior Art

A vehicle powered by the feet of a human for movement over a surface of water is disclosed in U.S. Pat. No. 6,595,813, issued Jul. 22, 2003, to Lekhtman. This vehicle consists of a frame for movement along a body axis extending horizontally. At least one transport member is connected to the frame for moving the vehicle over the surface. A pair of paddles rotatably supported by the frame for rotation about a transverse axis extending horizontally and perpendicular to the body axis are provided to engage and propel the vehicle over the surface. A pair of foot platforms are operatively connected to the paddles for rotating the paddles relative to the frame about the transverse axis.

SUMMARY OF THE INVENTION

The invention provides for a vehicle with the paddles extending longitudinally and rotatably supported by the frame in pendulum fashion for swinging movement between an extended position engaging the surface and a retracted position moved vertically out of engagement with the surface. A pair of depressors interconnect the foot platforms and the paddles for rotating the paddles between the extended position and the retracted position by lowering the paddles downwardly and into engagement with the surface and raising the paddles upwardly and out of engagement with the surface. It is an aspect of the present invention to provide each of the paddles including a propulsion bar and an oar connected by a lost-motion connection with the propulsion bar of the paddles supported by the frame to allow the oar of the paddles to slide relative to the propulsion bar of the paddles between the extended position and the retracted position.

It is an aspect of the present invention to provide the oar of the paddles having a fin-shape to propel the vehicle over water.

It is an aspect of the present invention to provide the oar of the paddles including a striker having a rounded-shape that extends from the oar of the paddles to propel the vehicle over land.

It is an aspect of the present invention to provide a pair of rear cords made of elastomeric material that are attached to the depressors adjacent the oar of the paddles and extending to the frame. The rear cords tighten to provide assistance to the oar of the paddles when moving from the extended position to the retracted position. Whereas, the rear cords stretch to provide resistance to the oar of the paddles when moving from the retracted position to the extended position.

It is an aspect of the present invention to provide the propulsion bar of the paddles presenting a slot that extends along the propulsion bar of the paddles with the depressors extending through the slot of the propulsion bar of the paddles to the oar of the paddles. A spring is disposed in the slot of the propulsion bar of the paddles and extends from the frame to the oar of the paddles. The spring compresses to provide assistance to the oar of the paddles when moving from the extended position to the retracted position. Whereas, the spring stretches to provide resistance to the oar of the paddles when moving from the retracted position to the extended position.

It is an aspect of the present invention to provide a pair of rear cords made of elastomeric material that are attached to the depressors adjacent the oar of the paddles and extending to the frame. The rear cords tighten to provide assistance to the oar of the paddles when moving from the extended position to the retracted position. Whereas, the rear cords stretch to provide resistance to the oar of the paddles when moving from the retracted position to the extended position. A spring is disposed in the propulsion bar of the paddles and extends from the frame to the oar of the paddles. The spring compresses to provide assistance to the oar of the paddles when moving from the extended position to the retracted position. The spring stretches to provide resistance to the oar of the paddles when moving from the retracted position to the extended position.

It is an aspect of the present invention to provide the frame having a pair of front poles and a pair of rear poles extending therefrom, each of which can be, for example, perpendicularly connected to the frame. The front poles can be spaced between the front end of the frame and the midpoint of the frame. A front crossbeam can extend between the front poles of the frame to define a u-shape. The rear poles can be spaced between the midpoint of the frame and the rear end of the frame. A rear crossbeam can extend between the rear poles of the frame to define a u-shape.

It is an aspect of the present invention to provide the frame with a transport member including a mono-hull, or a multi-hull arrangement. The multi-hull arrangement can be, for example, a pair of pontoons that are disposed adjacent the sides of the frame, for example. The transport member can be dimensioned for a single user or for multiple users.

It is an aspect of the present invention to provide the pontoons with a plurality of holes, and a plurality of pins having a cylindrical shape that are hingedly attached to the sides of the frame and are pivotally connected to the pontoons through the holes of the pontoons to allow the pontoons to be removed from the vehicle.

It is an aspect of the present invention to provide a pair of wheels that are affixed or removably attached to the frame or transport member. The wheels can be, for example, affixed or removably attached to the front, sides or rear of the transport member or frame.

It is an aspect of the present invention to provide a pair of front wheels that have a circular shape and are attached to the sides of the frame and are spaced between the front end of the frame and the midpoint of the frame to move the vehicle over land.

It is an aspect of the present invention to provide a pair of rear wheels that have a circular shape and are pivotally attached to the rear end of the frame to turn and move the vehicle over water and land.

It is an aspect of the present invention to provide the front wheels and the rear wheels having a radius that extends further from the frame than the transport member from the frame to allow the vehicle to move over land and seamlessly into water.

It is an aspect of the present invention to provide an axle that is pivotally connected between the rear wheels to dispose the rear wheels in tandem with each other while steering the vehicle.

It is an aspect of the present invention to provide a steering column extending between the front poles of the frame that is spaced above the front crossbeam of the frame to present a guideway extending through the steering column between the front poles of the frame.

It is an aspect of the present invention to provide a joystick that is slidably disposed in the guideway of the steering column and extends from the steering column away from the front crossbeam of the frame.

It is an aspect of the present invention to provide a pair of cables extending from the joystick along the guideway of the steering column, through the front poles of the frame, through the sides of the frame, and out of the rear end of the frame to connect to the rear wheels. The cables allow the user to slide the joystick along the guideway of the steering column and thereby pivot the rear wheels to turn the vehicle.

It is an aspect of the present invention to provide a pair of handles extending from the front poles of the frame and above the steering column that are adjustable vertically and circumferentially to allow a user to grip the handles and comfortably hold on to the vehicle.

It is an aspect of the present invention to provide a pair of front bars having a tubular shape that include a top and a bottom with the top of the front bars being pivotally connected to the front crossbeam of the frame.

It is an aspect of the present invention to provide a pair of rear bars having a tubular shape that include a top and a bottom with the top of the rear bars being pivotally connected to the rear crossbeam of the frame.

It is an aspect of the present invention to provide the foot platforms have a proximal end and a distal end. The proximal end of the foot platforms are pivotally connected to the bottom of the front bars. Whereas, the distal end of the foot platforms are pivotally connected to the bottom of the rear bars.

It is an aspect of the present invention to provide the proximal end of the foot platforms including a rim that has a c-shape for supporting the feet of the human on the foot platforms.

It is an aspect of the present invention to provide the rims with toe holders (e.g., straps or partial cover or full cover of area defined by rim). The toe holders can be adjustably disposed along the foot platforms in accordance with an illustrative embodiment.

It is an aspect of the present invention to provide with frame with a connector to another vehicle to allow pushing or pulling of the vehicle on its rear wheels and/or front wheels and/or side wheels by the other vehicle.

It is an aspect of the present invention to provide a pair of front cords made of elastomeric material that is attached to the bottom of the front bars adjacent the proximal end of the foot platforms and extending to the front end of the frame. The front cords tighten to provide assistance to the foot platforms when moving along the body axis toward the front end of the frame. Whereas, the front cords stretch to provide resistance to the foot platforms when moving along the body axis toward the rear end of the frame.

It will be understood that each of the illustrated or optional features of the various embodiments described above may be combined with other illustrated or optional features. Additionally, features described in combination with one particular embodiment may also be combined with one of the other embodiments.

Additional and/or other aspects and advantages of the present invention will be set forth in the description that follows, or will be apparent from the description, or may be learned by practice of the invention.

ADVANTAGES OF THE INVENTION

The invention in its broadest aspect allows the vehicle to move over a surface of water and land using an elliptical motion similar to the natural human motion of walking.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF ILLUSTRATIVE EMBODIMENTS

Figure 1:
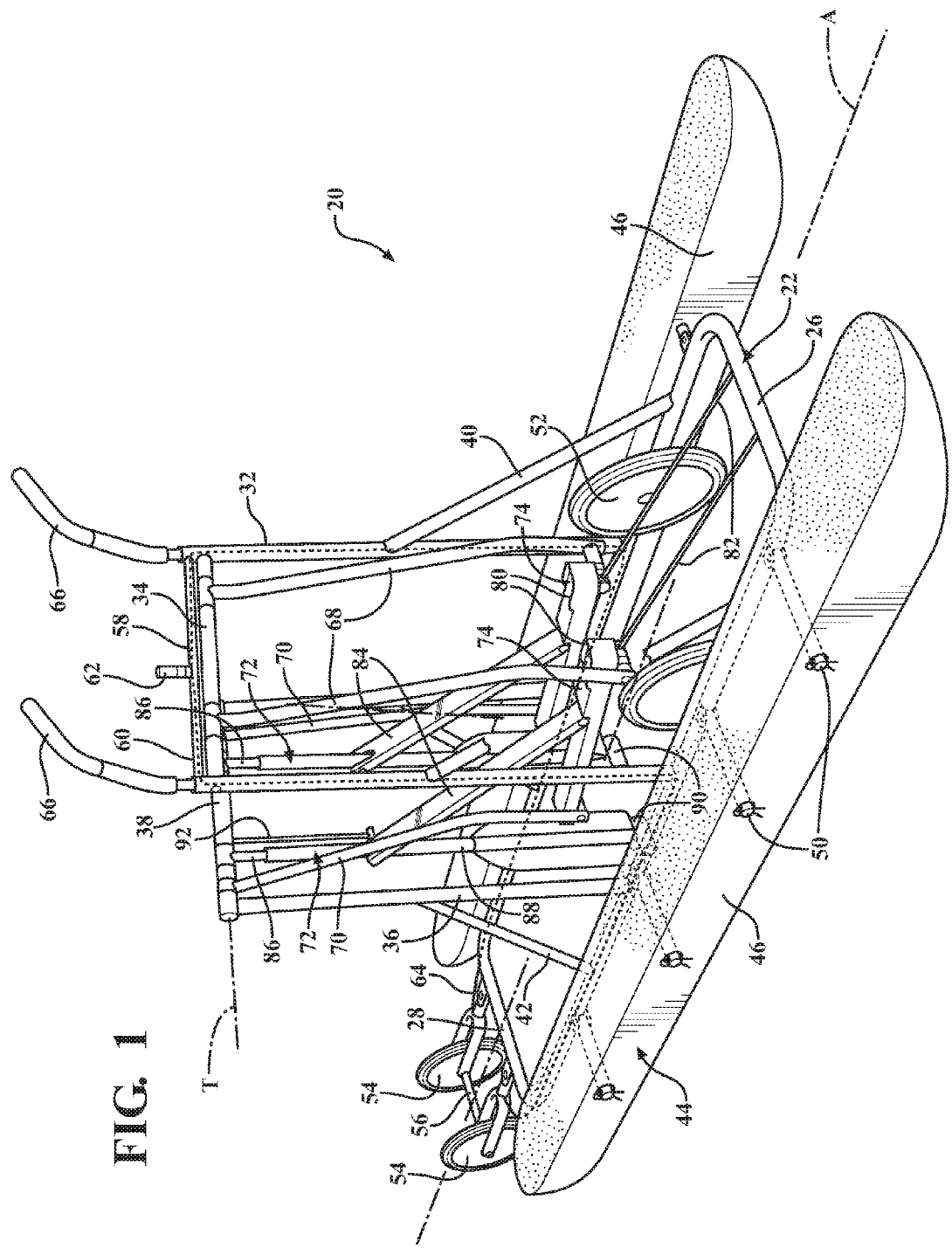
FIG. 1 is a perspective view of the vehicle showing the pontoons attached to the frame.
Figure 2:
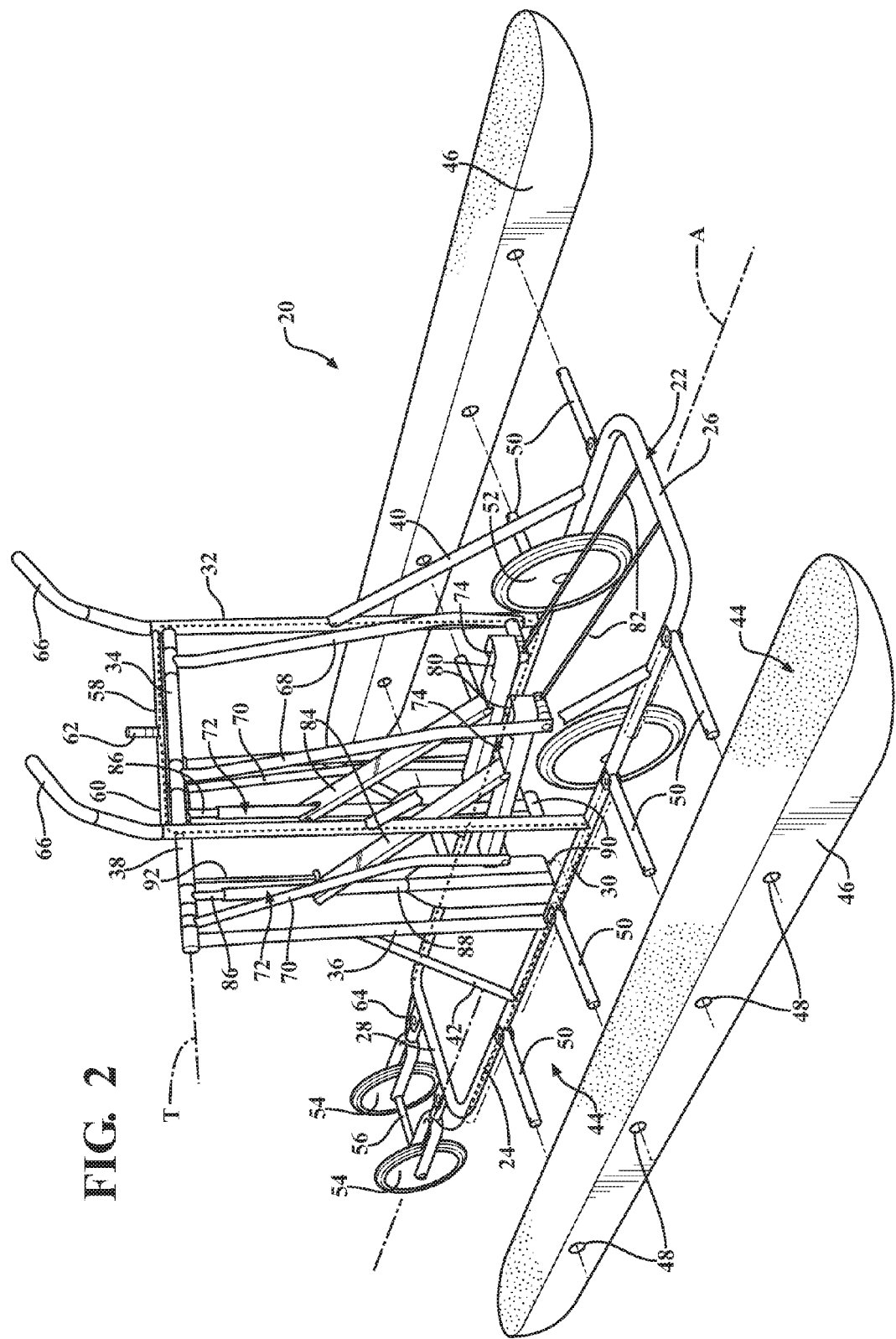
FIG. 2 is a perspective view of the vehicle showing the pontoons spaced from the frame.

Referring to the Figures, wherein like numerals indicate corresponding parts throughout the several views, a vehicle 20 as generally shown powered by the feet of a human for movement over a surface of water and land.

The vehicle 20 consists of a frame 22 as generally indicated including a pair of sides 24 having a tubular shape spaced from one another. The sides 24 of the frame 22 extend between a front end 26 and a rear end 28 and presenting a midpoint 30 equidistant therebetween for movement along a body axis (A) extending horizontally. The frame 22 further includes a pair of front poles 32 perpendicularly connected to the sides 24 of the frame 22. Each of the front poles 32 are spaced between the front end 26 of the frame 22 and the midpoint 30 of the frame 22 with a front crossbeam 34 extending between the front poles 32 of the frame 22 to define a u-shape spacing the sides 24 of the frame 22 apart. The frame 22 further includes a pair of rear poles 36 perpendicularly connected to the sides 24 of the frame 22. Each of the rear poles 36 of the frame 22 are spaced between the midpoint 30 of the frame 22 and the rear end 28 of the frame 22 with a rear crossbeam 38 extending between the rear poles 36 of the frame 22 to define a u-shape further spacing the sides 24 of the frame 22 apart. The frame 22 can alternatively be configured to be integrated at least on part with the transport member described below and does not necessary require a tubular structure with each of the sides 24 and front end 26 and rear end 28.

To reinforce the front poles 32 of the frame 22 to the sides 24 of the frame 22, a pair of front stabilizers 40 are connected to each of the front poles 32 of the frame 22 and slant to the sides 24 of the frame 22 spaced from the front end 26 of the frame 22. To reinforce the rear poles 36 of the frame 22 to each of the sides 24 of the frame 22, a pair of rear stabilizers 42 are connected to each of the rear poles 36 of the frame 22 and slant to each of the sides 24 of the frame 22 spaced from the rear end 28 of the frame 22.

In order to move the vehicle 20 over the surface, at least one transport member 44 is generally indicated connected to the frame 22 for moving the vehicle 20 over water. The transport member 44 can be a mono-hull, or a multi-hull arrangement. The multi-hull arrangement can be, for example, a pair of pontoons 46 that are disposed adjacent the sides of the frame, for example. Each of a mono-hull or a multi-hull transport member 44 can be dimensioned for a single user or for multiple users and can have a non-slip material arranged thereon to facilitate a human walking along the transport member 44.

Figure 14:
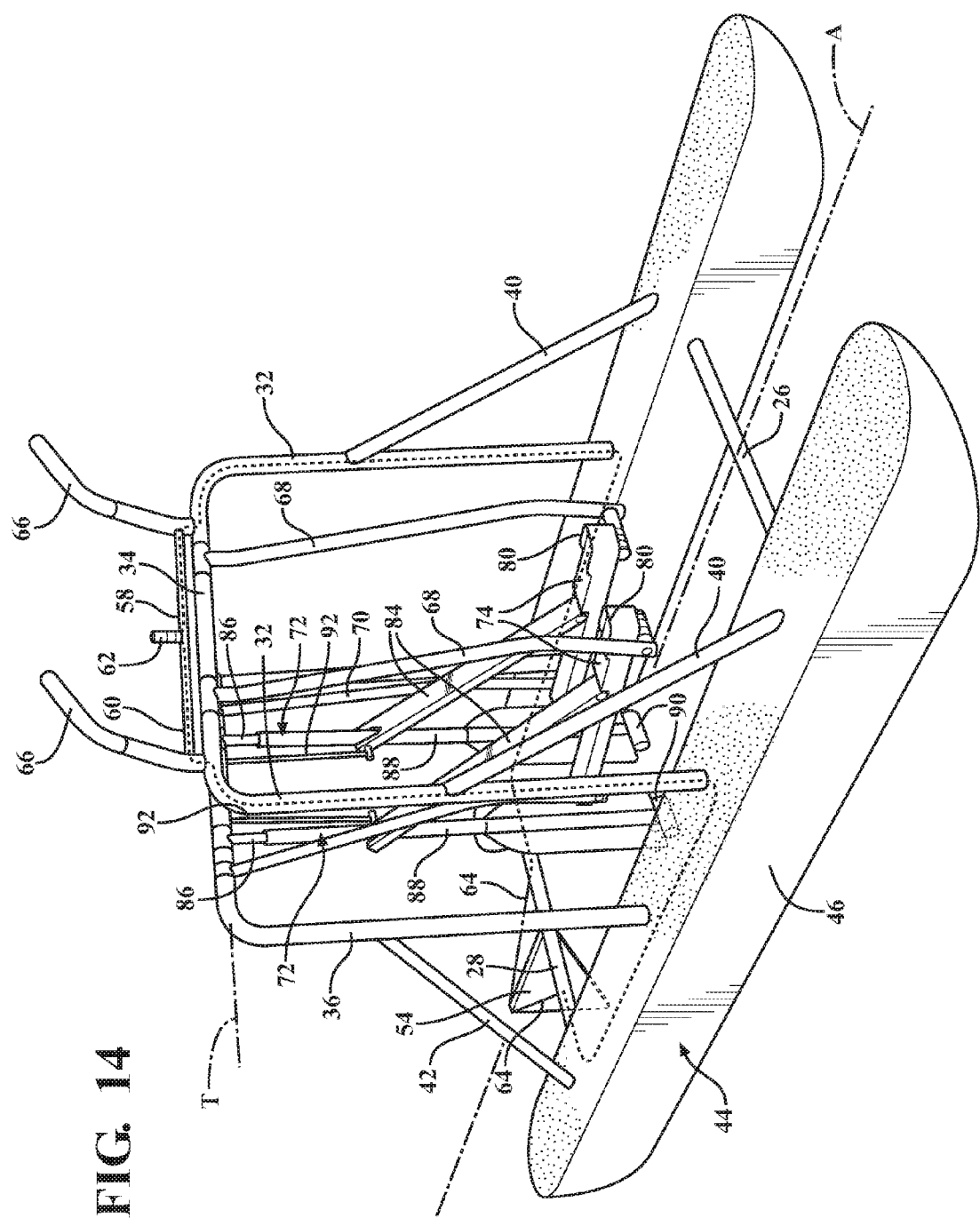
FIG. 14 is a perspective view of an alternative embodiment showing the frame attached to the top of the pontoons

In accordance with an illustrative embodiment, if the transport member 44 includes a pair of pontoons 46 disposed adjacent the sides 24 of the frame 22, a plurality of holes 48 can extend through the pontoons 46. A plurality of pins 50 having a cylindrical shape are hingedly attached to the sides 24 of the frame 22. The pins 50 are pivotally connected to the pontoons 46 through the holes 48 of the pontoons 46 to allow the pontoons 46 to be removed from the vehicle 20. In another embodiment, the pins 50 may telescope into the holes 48 of the pontoons 46. In an alternative embodiment, as best shown in FIG. 14, the frame 22 may be directly attached to the pontoons 46.

To move the vehicle 20 over land, the transport member 44 or frame 22 further includes a pair of wheels having a circular shape that are affixed or removably attached thereto. The wheels can be, for example, affixed or removably attached to the front, sides or rear of the transport member 44 or frame 22.

Figure 4:
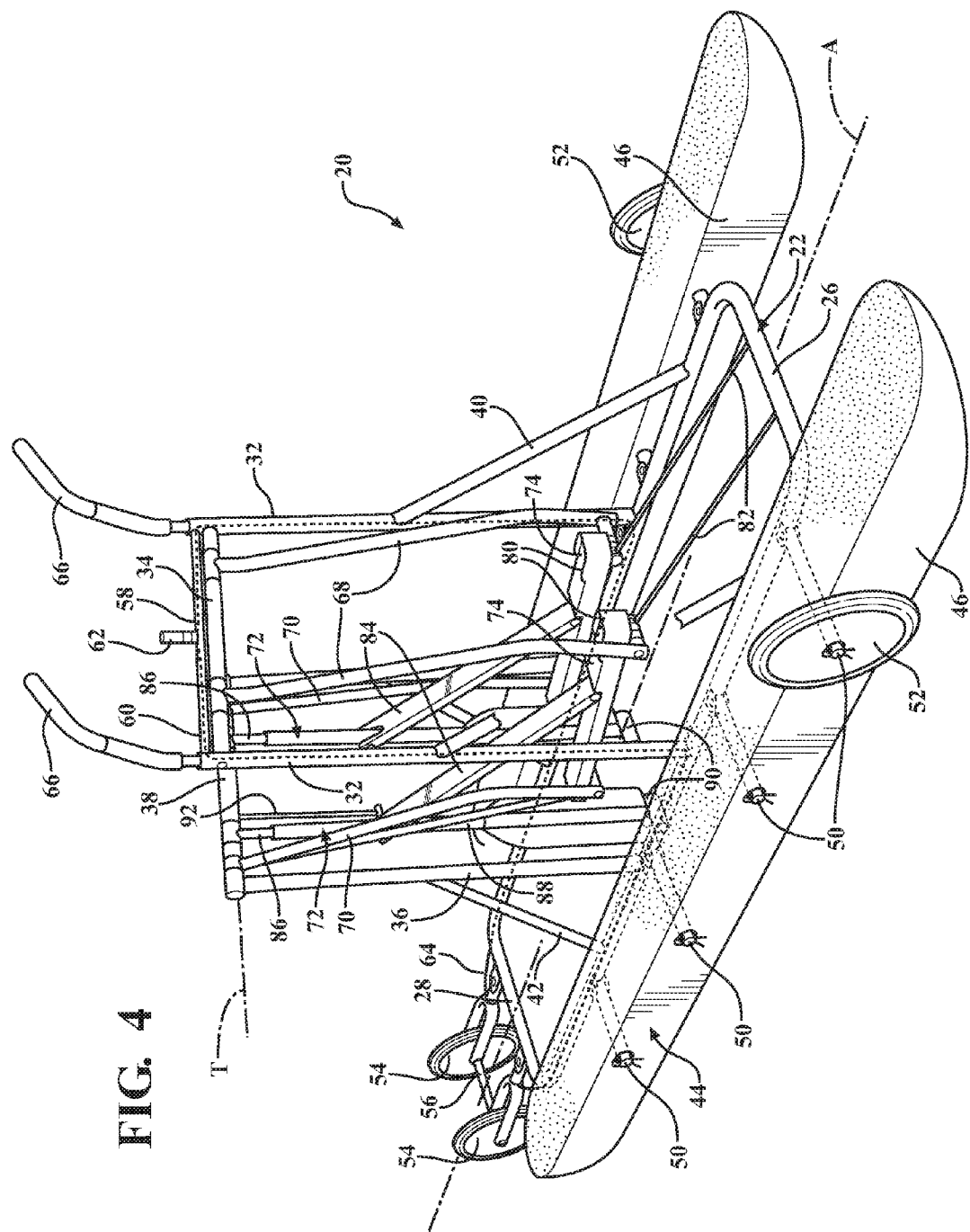
FIG. 4 is a perspective view of the vehicle showing the front wheels attached at the outside of the pontoons.

In accordance with an illustrative embodiment, a pair of front wheels 52 can be attached to the sides 24 of the frame 22 and spaced between the front end 26 of the frame 22 and the midpoint 30 of the frame 22. In another embodiment, as best shown in FIG. 4, the front wheels 52 may be attached to the pins 50 at the outside of the pontoons 46 to provide a wheelbase with greater stability over land. To turn the vehicle 20 over water and land, and move the vehicle 20 over land, the vehicle 20 further includes a pair of rear wheels 54 having a circular shape pivotally attached to the rear end 28 of the frame 22. The front wheels 52 and the rear wheels 54 are spokeless to prevent water from flowing through, thereby allowing the rear wheels 54 to act as rudders and the front wheels 52 to act as stability keels. Furthermore, the front wheels 52 and the rear wheels 54 have a radius that extends further from the frame 22 than the pontoons 46, which allows the vehicle 20 to move over land and seamlessly into water. An axle 56 is pivotally connected between the rear wheels 54 to dispose the rear wheels 54 in tandem with each other while steering the vehicle 20.

Figure 10:
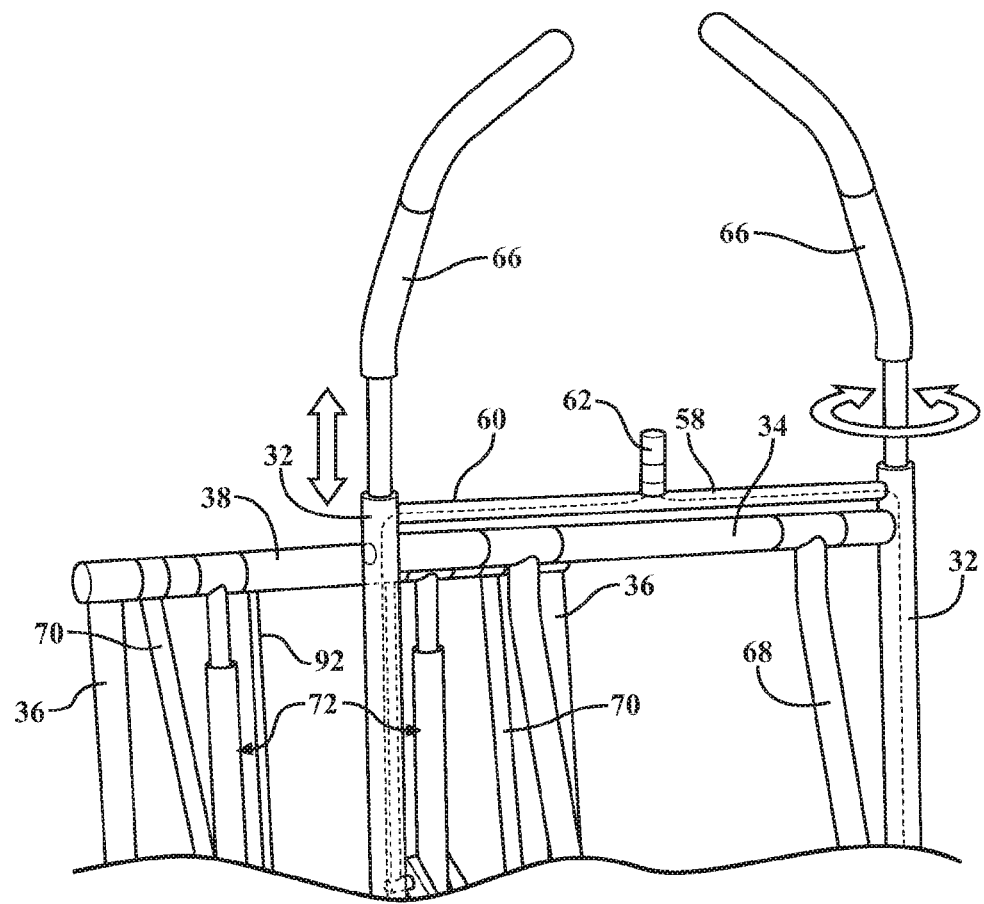
FIG. 10 is an enlarged fragmentary view showing the handles.
Figure 11:
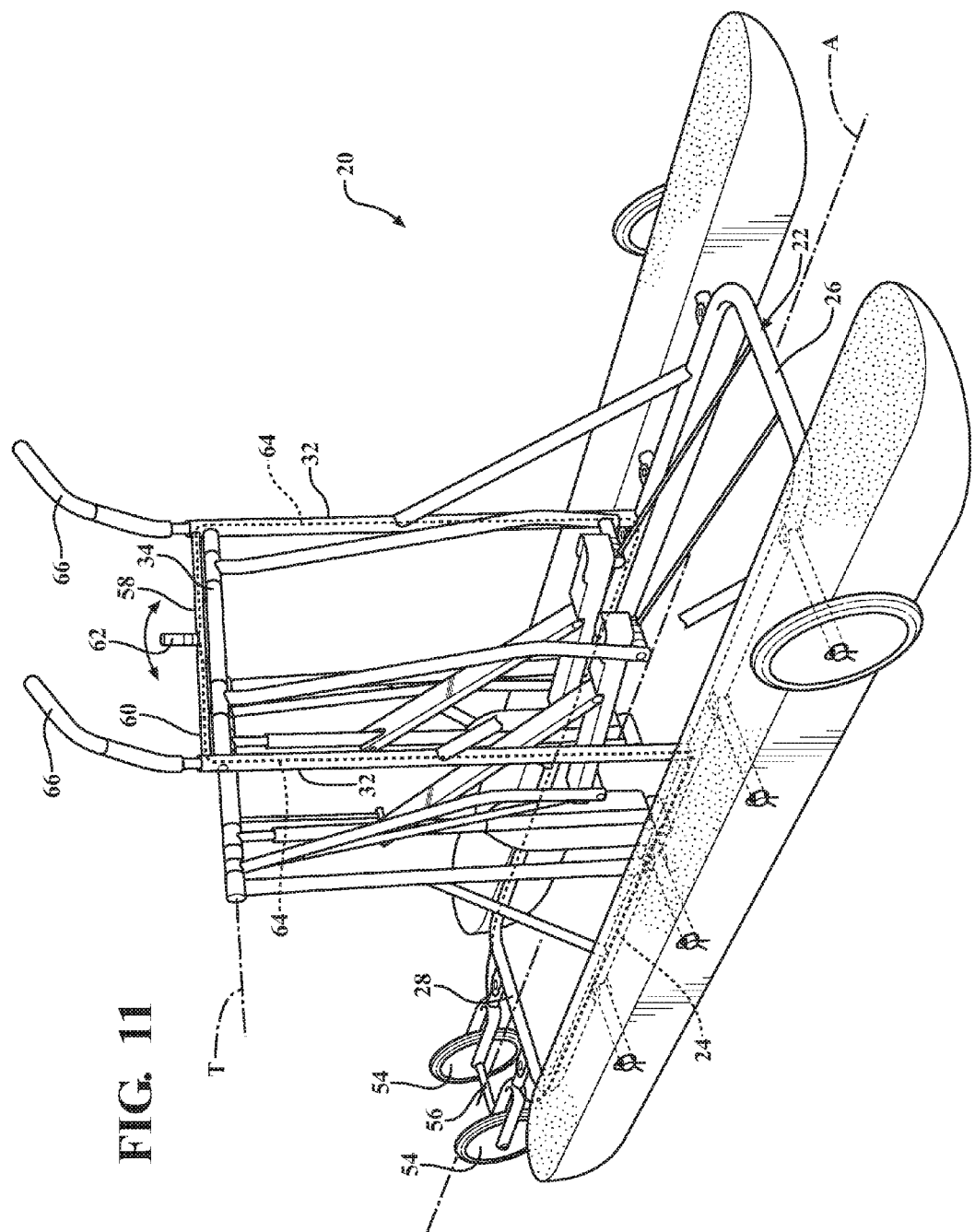
FIG. 11 is a perspective view showing the cables through the frame.
Figure 12A:
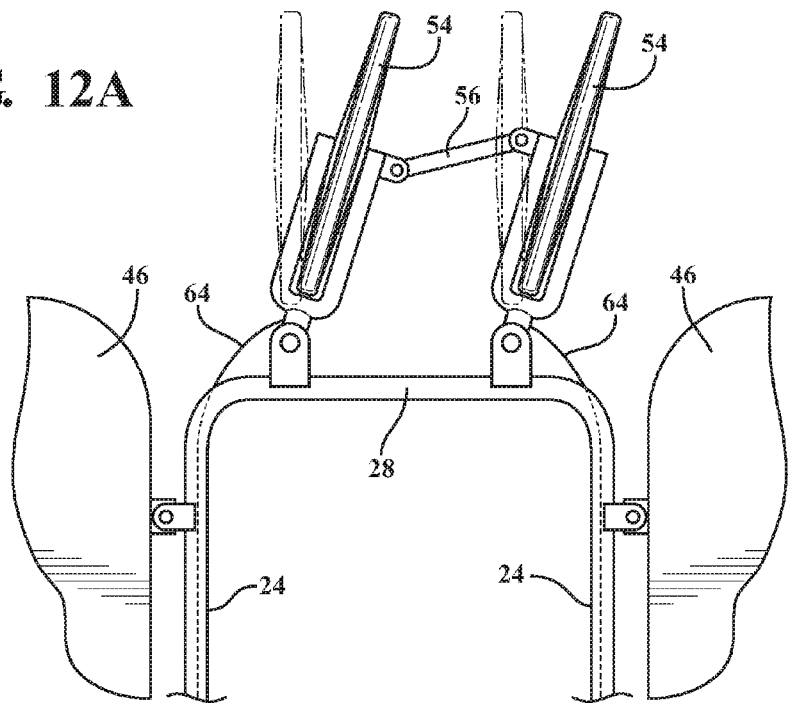
FIG. 12A is a top view of the rear wheels turning left.
Figure 12B:
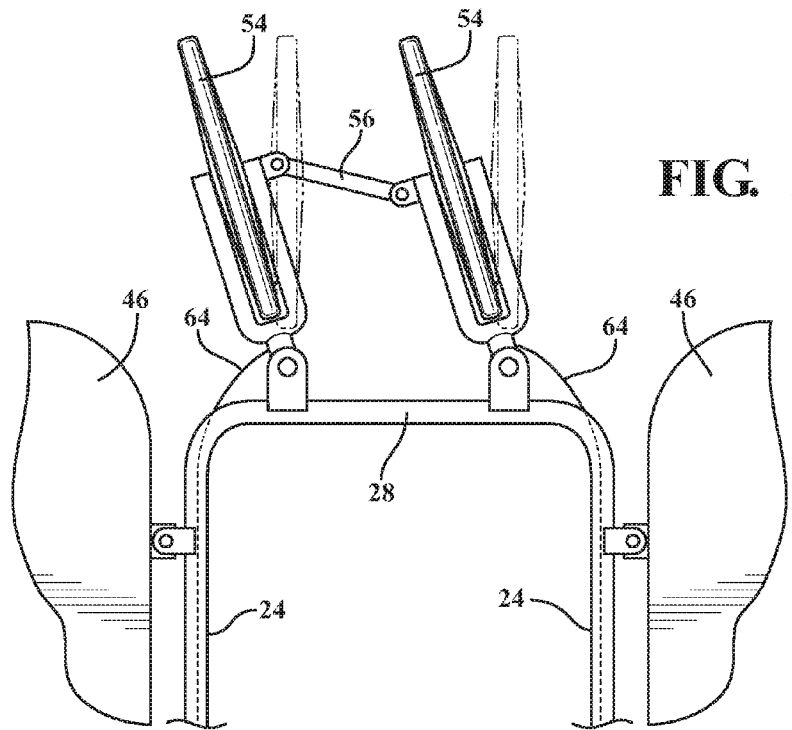
FIG. 12B is a top view of the rear wheels turning right.

As best shown in FIG. 11, a steering column 58 extends between the front poles 32 of the frame 22 and is spaced above the front crossbeam 34 of the frame 22 to present a guideway 60 extending through the steering column 58 between the front poles 32 of the frame 22. A joystick 62 is slidably disposed in the guideway 60 of the steering column 58 and extends from the steering column 58 away from the front crossbeam 34 of the frame 22. A pair of cables 64 extend from the joystick 62 through the guideway 60 of the steering column 58, through the front poles 32 of the frame 22, through the sides 24 of the frame 22, and out of the rear end 28 of the frame 22 to connect to the rear wheels 54. The cables 64 may extend exteriorly along the steering column 58 and be inserted at any point along the frame to connect to the rear wheels 54. As best shown in FIGS. 12A and 12B, the cables 64 allow the user to slide the joystick 62 along the guideway 60 of the steering column 58, thereby pivoting the rear wheels 54 left and right to turn the vehicle 20. A pair of handles 66 extend from the front poles 32 of the frame 22 and above the steering column 58. As best shown in FIG. 10, the handles 66 are adjustable vertically and circumferentially to allow a user to grip the handles 66 and comfortably hold on to the vehicle 20 regardless of the height of the human. The handles 66 may be adjusted, but not limited to, means of friction or the handles 66 may have a knob and define a plurality of slots, which the knob of the handles 66 may be inserted.

A pair of front bars 68 that have a tubular shape include a top and a bottom with the top of the front bars 68 being pivotally connected to the front crossbeam 34 of the frame 22. A pair of rear bars 70 that have a tubular shape include a top and a bottom with the top of the rear bars 70 being pivotally connected to the rear crossbeam 38 of the frame 22. To engage and propel the vehicle 20 over the surface, a pair of paddles 72 are rotatably supported by the frame 22 for rotation about a transverse axis (T) extending horizontally and perpendicular to the body axis (A). A pair of foot platforms 74 having a non-slip material are operatively connected to the paddles 72 for rotating the paddles 72 relative to the frame 22 about the transverse axis (T). The foot platforms 74 have a proximal end 76 and a distal end 78. The proximal end 76 of the foot platforms 74 are pivotally connected to the bottom of the front bars 68. The distal end 78 of the foot platforms 74 are pivotally connected to the bottom of the rear bars 70.

Figure 15:
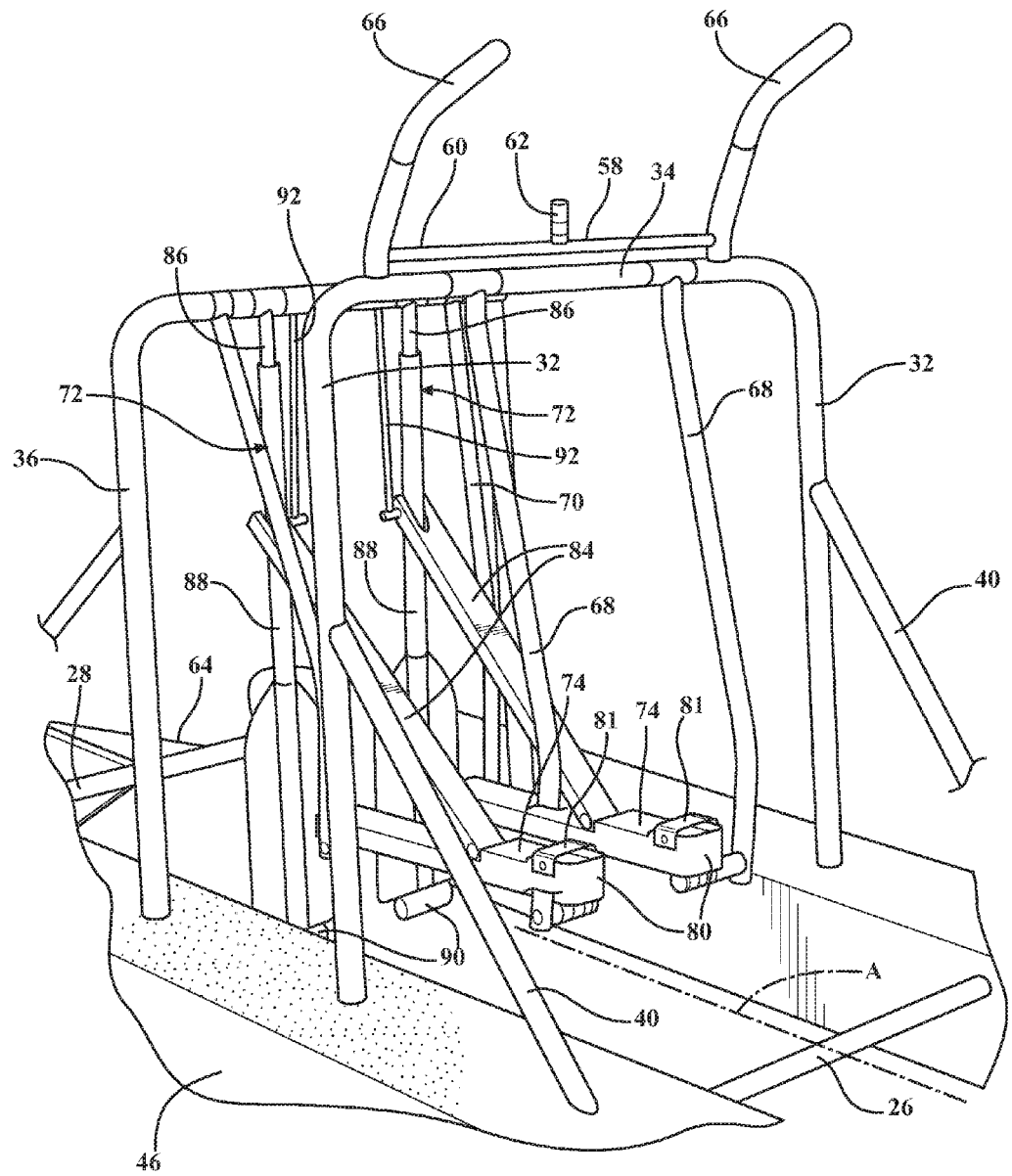
FIG. 15 is a perspective view of the vehicle showing toe straps connected to the foot platforms.
Figure 16:
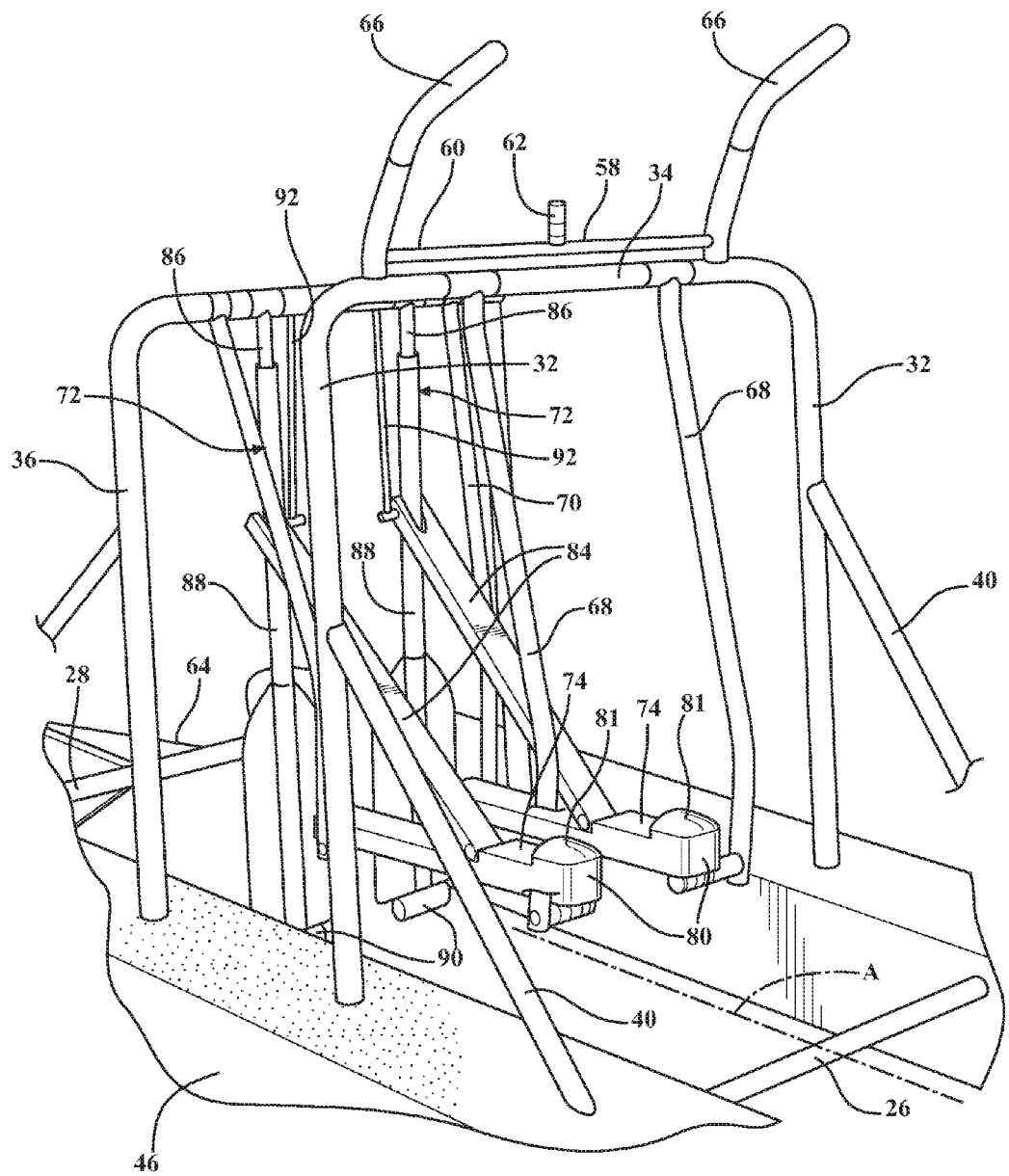
FIG. 16 is a perspective view of the vehicle showing an alternative embodiment of toe clips or toe cover connected to the foot platforms.

To support the feet of the human on the foot platforms 74, the proximal end 76 of the foot platforms 74 includes a rim 80 having a c-shape that can optionally be provided with a toe holder 81 such as, for example, a toe strap 81 as shown in FIG. 15 or a toe clip or cover 81 as shown in FIG. 16. The toe holder 81 can be, for example, a flexible or non-flexible material that is affixed to the rim 80 by conventional attachment means, and that partially or completely covers the area defined by the c-shape, thereby creating a defined space in which the user inserts at least the toes of her foot. The toe strap or clip or cover 81 abuts the top of the foot when inserted into the c-shape area of the foot platform during use of the vehicle 20 and facilitates the "Swing-Step-Strike" (SSS) motion described below. Placement of the toe holders 81 can be adjustable along their corresponding foot platforms 74 or depressors 84 such as by sliding them, or having them be securable anywhere along the foot platforms 74 or the depressors 84 using conventional attachment means. By placing at least a portion of each of the user's feet under a respective toe holder 81, the user can achieve more of a jogging motion than a walking motion for greater power, speed, and resistance if more strenuous exercise is desired. For example, the toe holders 81 give the user more control to apply more power to the downward movement of one foot as it depresses its foot depressor 84 while the other foot lifts its foot platform 74 during the corresponding actions of the users legs and feet during the Swing-Step-Strike" (SSS) motion described below, without concern for the user's feet slipping off the foot platforms 74. In addition, adjusting or strapping toe holder 81 at different places along the foot platforms 74 or the depressors 84 can give the user different amounts of power or force in moving the vehicle 20 along on land or water.

A pair of front cords 82 made of elastomeric material are attached to the bottom of the front bars 68 adjacent the proximal end 76 of the foot platforms 74 and extend to the front end 26 of the frame 22. When the foot platforms 74 move along the body axis (A) the front end 26 of the frame 22, the front cords 82 tighten to provide assistance to the movement of the foot platforms 74. When the foot platforms 74 move along the body axis (A) toward the rear end 28 of the frame 22, the front cords 82 stretch to provide resistance to the movement of the foot platforms 74. The front cords 82 may be interchangeable with a range of elastic materials to change the resistance and assistance provided by the front cords 82. In other words, making it harder or easier to swing the foot platforms 74 along the body axis (A) and provide a variable workout.

Figure 5:
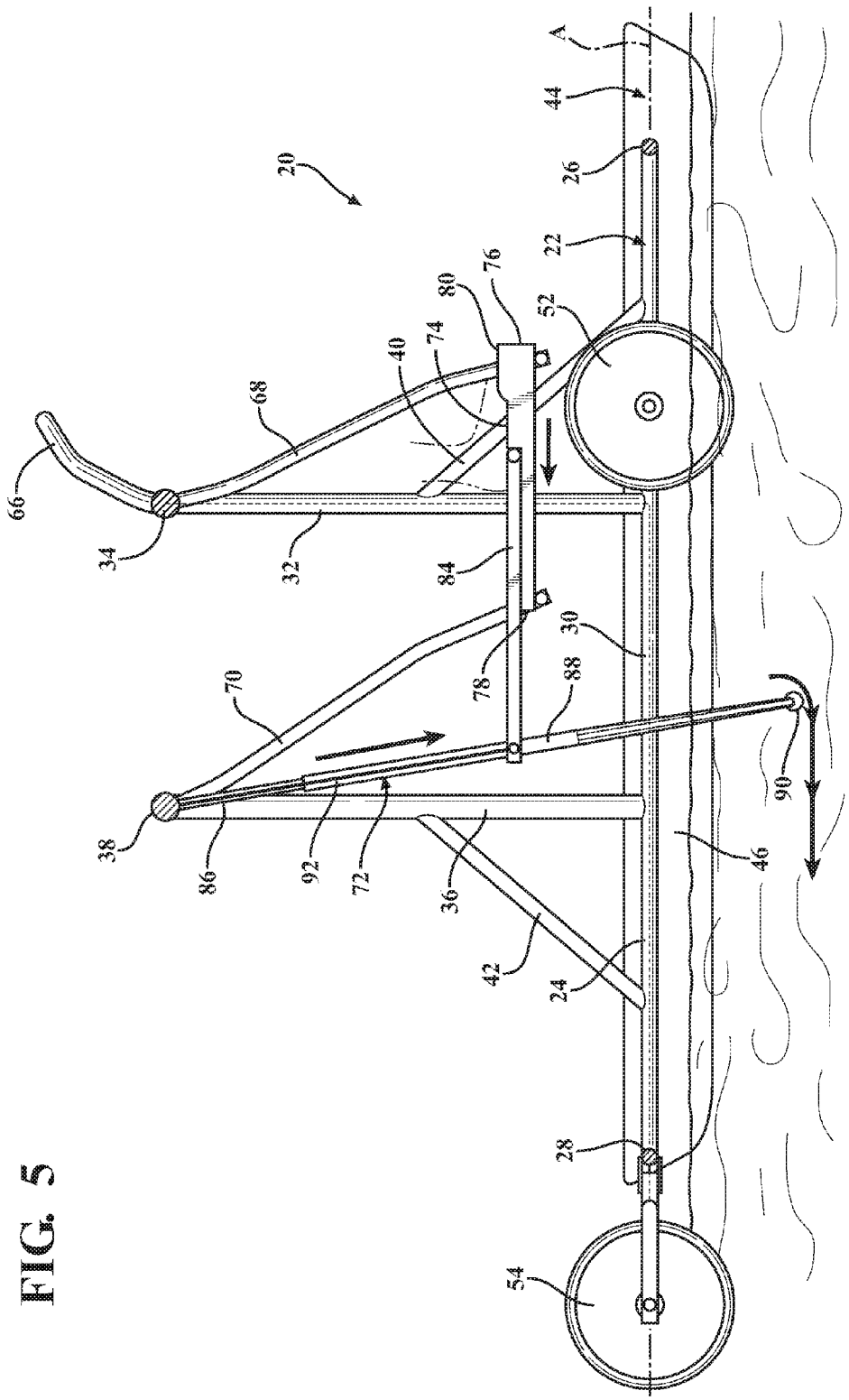
FIG. 5 is a cross-sectional side view of the vehicle showing the paddles in the extended position.
Figure 6:
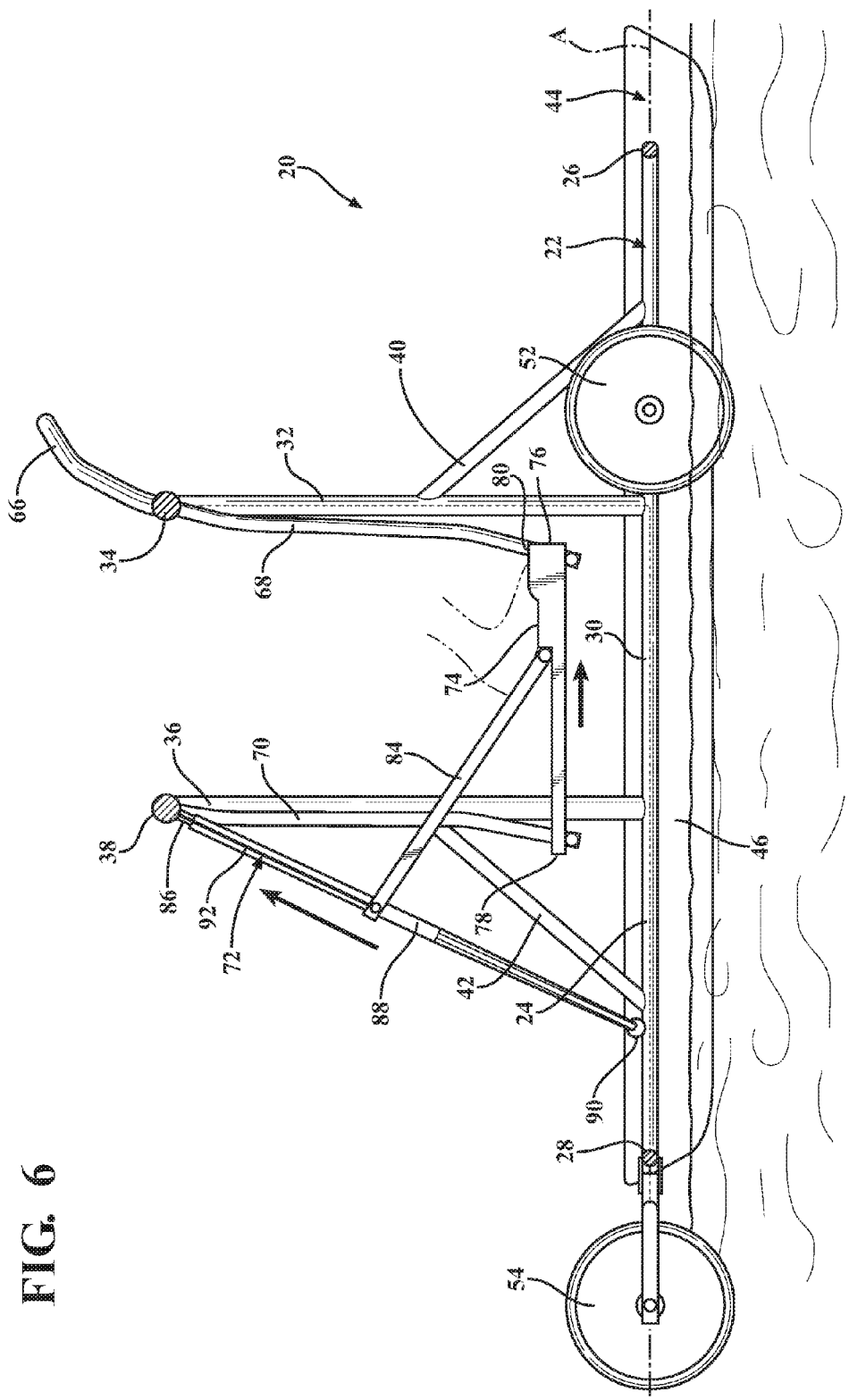
FIG. 6 is a cross-sectional side view of the vehicle showing the paddles in the retracted position.

The vehicle 20 is characterized by the paddles 72 extending longitudinally and being rotatably supported by the frame 22 in pendulum fashion for swinging movement between an extended position engaging the surface and a retracted position moved vertically out of engagement with the surface. A pair of depressors 84 interconnect the foot platforms 74 and the paddles 72 to rotate the paddles 72 between the extended position and the retracted position. As best shown in FIG. 5, the depressors 84 rotate the paddles 72 from the retracted position to the extended position by lowering the paddles 72 downwardly and into engagement with the surface. As best shown in FIG. 6, the depressors 84 rotate the paddles 72 from the extended position to the retracted position by raising the paddles 72 upwardly and out of engagement with the surface.

Figure 13A:
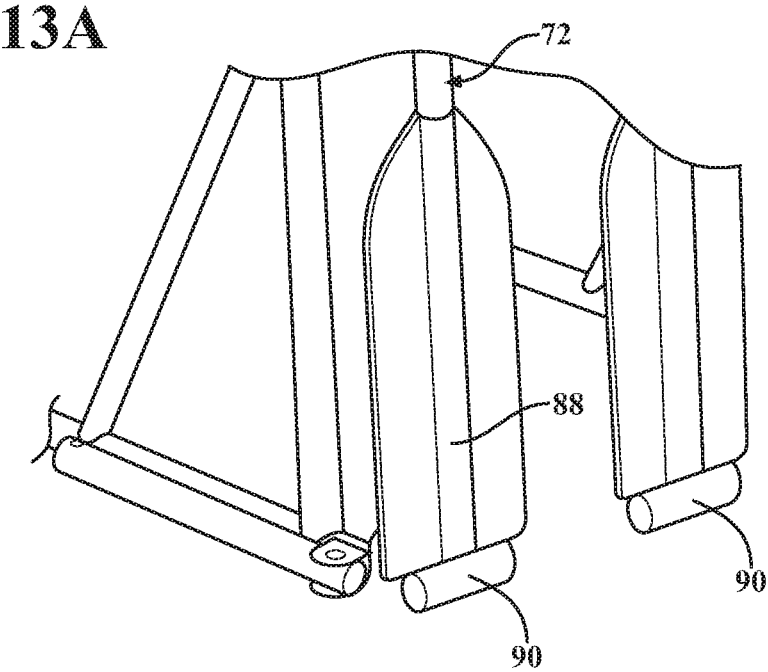
FIG. 13A is a fragmentary view showing an alternative embodiment of the strikers for use on a street or road.
Figure 13B:
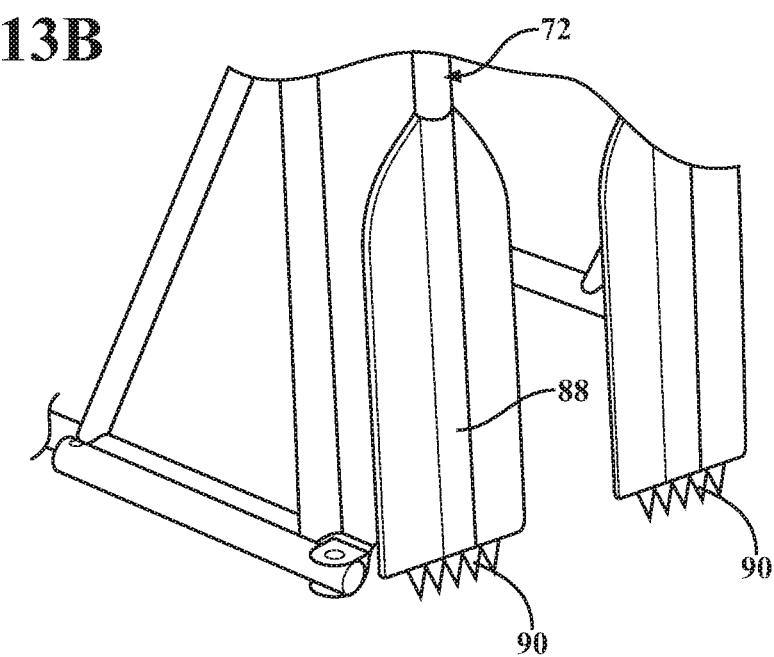
FIG. 13B is a fragmentary view showing an alternative embodiment of the strikers for use on snow or ice.

The vehicle 20 is further characterized by each of the paddles 72 including a propulsion bar 86 and an oar 88 connected by a lost-motion connection, with the propulsion bar 86 of the paddles 72 is pivotally connected to the rear crossbeam 38 of the frame 22, allowing the propulsion bar 86 and the oar 88 to slide relative to one another between the extended position and the retracted position. The oar 88 of the paddles 72 has a fin-shape to propel the vehicle 20 over water. The oar 88 of the paddles 72 includes a striker 90 extending from the oar 88 of the paddles 72 to propel the vehicle 20 over land. It should be appreciated that the land could alternatively have other forms, such as, but not limited to, a street, road, snow, ice, or ground. As best shown in FIG. 13A, the strikers 90 are a rounded-shape for use on land, such as, but not limited to, a street or road. As best shown in FIG. 13B, the strikers 90 are a stud or spike shape for use on land, such as snow, ice, or ground. It should be appreciate that the strikers 90 are not limited to the aforementioned shapes, but may also include other shapes for use with other surfaces. Similarly, the strikers 90 could be made of alternative materials, such as, but not limited to, rubber for when the surface is wet.

Figure 7A:
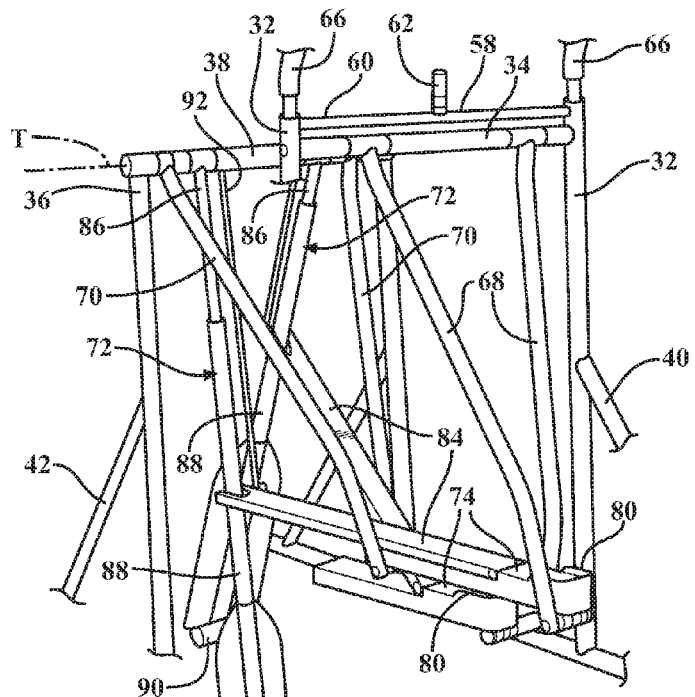
FIGS. 7A and 7B are fragmentary views of the first species.
Figure 7B:
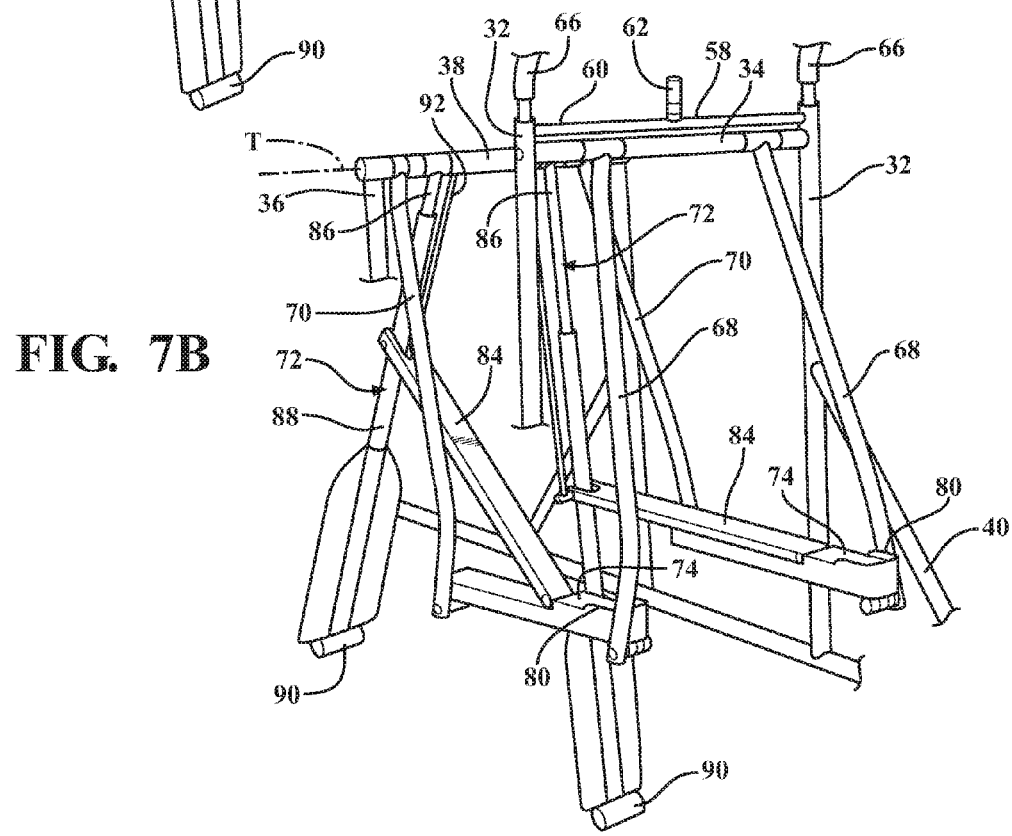

In the first species of the invention, shown in FIGS. 7A and 7B, the lost-motion connection of the propulsion bar 86 of the paddles 72 and the oar 88 of the paddles 72 includes the oar 88 of the paddles 72 being slidably disposed about the propulsion bar 86 of the paddles 72. A pair of rear cords 92 made of elastomeric material attached to the depressors 84 adjacent the oar 88 of the paddles 72 and extending to the rear crossbeam 38 of the frame 22. The rear cords 92 tighten to provide assistance to the oar 88 of the paddles 72 when moving from the extended position to the retracted position. Alternatively, the rear cords 92 stretch to provide resistance to the oar 88 of the paddles 72 when moving from the retracted position to the extended position. The rear cords 92 may be interchangeable with a range of elastic materials to change the resistance and assistance provided by the rear cords 92. In other words, making it harder or easier to push the depressors 84 between the retracted position and the extended position to provide a further variable workout.

Figure 8A:
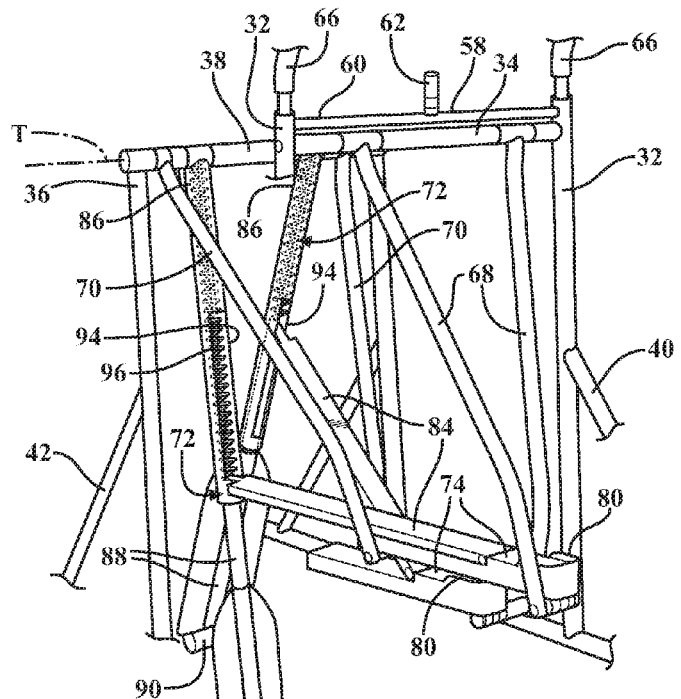
FIGS. 8A and 8B are fragmentary views of the second species.
Figure 8B:
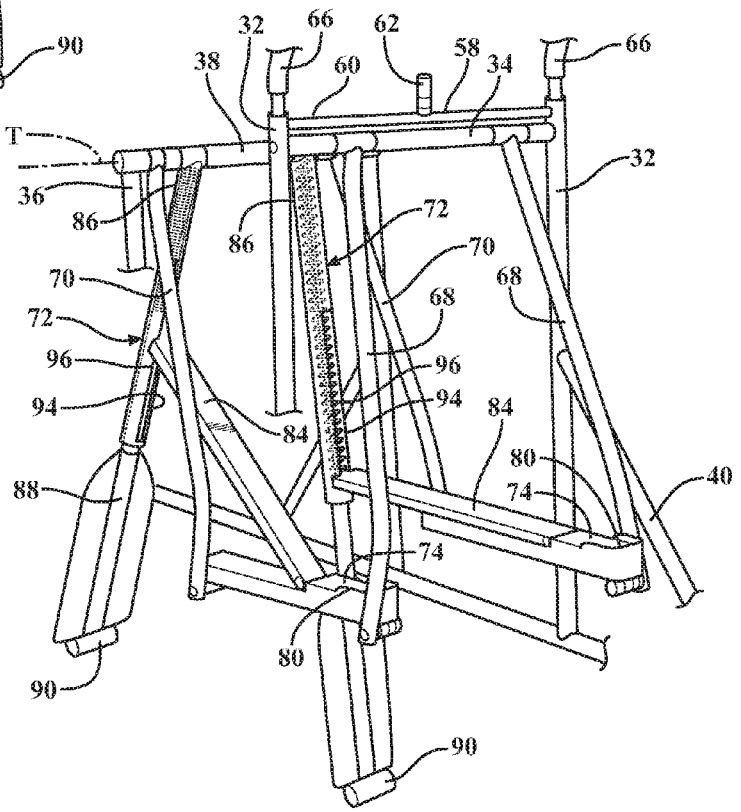

In the second species of the invention, shown in FIGS. 8A and 8B, the lost-motion connection of the propulsion bar 86 of the paddles 72 and the oar 88 of the paddles 72 includes the oar 88 of the paddles 72 being slidably disposed in the propulsion bar 86 of the paddles 72. The propulsion bar 86 of the paddles 72 presenting a slot 94 extending along the propulsion bar 86 of the paddles 72. The depressors 84 extending through the slot 94 of the propulsion bar 86 of the paddles 72 to the oar 88 of the paddles 72. A spring 96 disposed in the slot 94 of the propulsion bar 86 of the paddles 72 and extending from the rear crossbeam 38 of the frame 22 to the oar 88 of the paddles 72. The springs 96 compress to provide assistance to the oar 88 of the paddles 72 when moving from the extended position to the retracted position. Alternatively, the springs 96 stretch to provide resistance to the oar 88 of the paddles 72 when moving from the retracted position to the extended position.

Figure 9A:
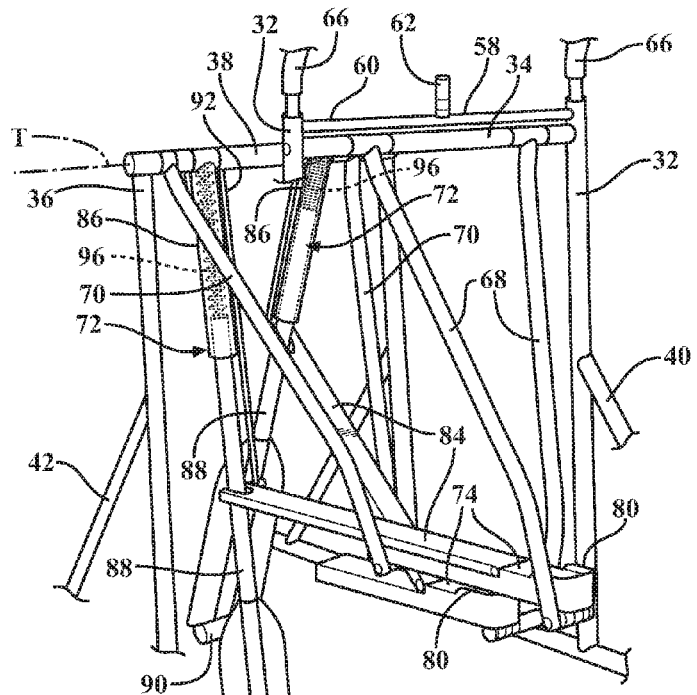
FIGS. 9A and 9B are fragmentary views of the third species.
Figure 9B:
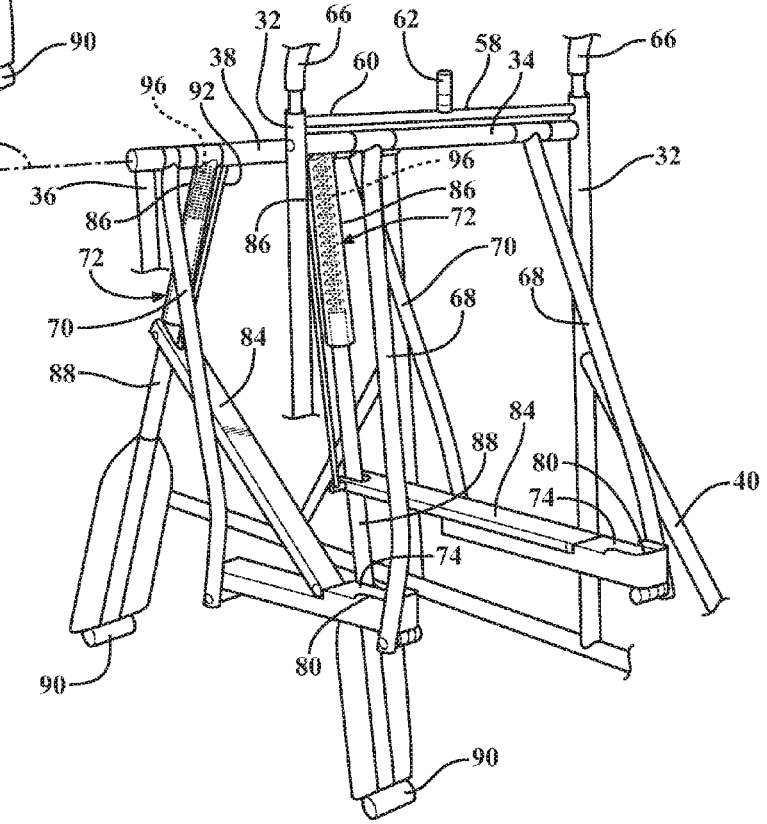

In the third species of the invention, shown in FIGS. 9A and 9B, the lost-motion connection of the propulsion bar 86 of the paddles 72 and the oar 88 of the paddles 72 includes the oar 88 of the paddles 72 being slidably disposed in the propulsion bar 86 of the paddles 72. A pair of rear cords 92 made of elastomeric material attached to the depressors 84 adjacent the oar 88 of the paddles 72 and extending to the rear crossbeam 38 of the frame 22. As in the first species, the rear cords 92 tighten to provide assistance to the oar 88 of the paddles 72 when moving from the extended position to the retracted position. Alternatively, the rear cords 92 stretch to provide resistance to the oar 88 of the paddles 72 when moving from the retracted position to the extended position. A spring 96 disposed in the propulsion bar 86 of the paddles 72 and extending from the rear crossbeam 38 of the frame 22 to the oar 88 of the paddles 72. As in the second species, the springs 96 compress to provide assistance to the oar 88 of the paddles 72 when moving from the extended position to the retracted position. Alternatively, the springs 96 stretch to provide resistance to the oar 88 of the paddles 72 when moving from the retracted position to the extended position.

In an alternative embodiment, a coil or rubber stop is disposed on the foot platforms 74 between the foot platforms 74 and the depressors 84 for pushing the depressor 84 upwardly to provide assistance to the oar 88 of the paddles 72 moving from the extended position to the retracted position.

The method of moving a vehicle 20 over a surface of water and land consisting of a frame 22 for movement along a body axis (A) extending horizontally, a paddle 72 rotatably supported by the frame 22 for rotation about a transverse axis (T) extending horizontally and perpendicular to the body axis (A), a foot platform 74 operatively connected to the paddle 72, a depressor 84 interconnecting the foot platform 74 and the paddle 72, the method comprising the steps of:

1) pushing the depressor 84 downwardly,
2) lowering the paddle 72 into engagement with the surface,
3) swinging the foot platform 74 backward along the body axis (A),
4) rotating the paddle 72 clockwise about the transverse axis (T) propelling the vehicle 20 forward along the body axis (A),
5) raising the paddles 72 out of engagement with the surface,
6) swinging the foot platforms 74 forward along the body axis (A),
7) rotating the paddles 72 counter-clockwise about the transverse axis (T).

This method of moving the vehicle 20 provides a propulsion system using an elliptical motion that utilizes two highly used ergonomically comfortable motions that are most common in the propulsion of people on both water and land. When the vehicle 20 is on land, this motion mirrors the actions of legs walking, and when outfitted with wheels 52, 54 you achieve a kind of rolling walk. When the vehicle 20 is on water, the motion mirrors the common stroke that a canoeist uses, albeit done with arms rather than legs. It is this commonality of the motion that allows the vehicle 20 to move seamlessly between water and land when embodied with the appropriate pontoons 46, front wheels 52, rear wheels 54, oars 88, and strikers 90.

In operation of the propulsion system, the foot of the human may be disposed on both the depressor 84 and the foot platform 74. However, the foot of the human may be disposed on only the depressor 84 to propel and move the vehicle 20 faster. First, the foot of the human pushes the depressor 84 downwardly, thereby moving the oar 88 of the paddle 72 to the extended position into engagement with the surface, and stretching the rear cords 92. Second, the force of the foot of the human on the depressor 84 swings the foot platform 74 backward, stretching the front cords 82, and rotating the paddle 72 clockwise about the transverse axis (T). Thus, pivoting the front bar 68 and the rear bar 70 clockwise about the front crossbeam 34 and the rear crossbeam 38 of the frame 22, respectively, along the body axis (A) towards the rear end 26 of the frame 22. As a result, the vehicle 20 is propelled over the surface forward along the body axis (A). Third, the foot of the human is removed from the depressor 84 and pushes the foot platform 74 forward, which allows the rear cord 92 or the spring 96 to move the oar 88 of the paddle 72 from the extended position to the retracted position out of engagement with the surface. Fourth, the force of the foot of the human on the foot platform 74 swings the foot platform 74 forward, constricting the front cords 82, and rotating the paddle 72 counter-clockwise about the transverse axis (T). Thus, pivoting the front bar 68 and the rear bar 70 counter-clockwise about the front crossbeam 34 and the rear crossbeam 38 of the frame 22, respectively, along the body axis (A) towards the front end 24 of the frame 22. It should be appreciated that these steps could be performed in any combination to propel the vehicle 20 over the surface either forward or backward along the body axis (A).

In operation of turning and steering the vehicle 20, the human slides the joystick 62 along the guideway 60 of the steering column 58 either left towards one of the front poles 32 of the frame 22 or right towards the other of the front poles 32 of the frame 22. When the joystick 62 slides to the right, the cable 64 pulls one of the rear wheels 54 to the left. As a result, as best shown in FIG. 12A, the axle 56 moves the rear wheels 54 in tandem to the left, thereby turning the vehicle 20 to the left. When the joystick 62 slides to the left, the cable 64 pulls one of the rear wheels 54 to the right. As a result, as best shown in FIG. 12B, the axle 56 moves the rear wheels 54 in tandem to the right, thereby turning the vehicle 20 to the right.

In accordance with another illustrative embodiment, the rear wheels 54 and/or front wheels 52 and/or side wheels of the vehicle 20 can be configured to meet highway transportation safety regulations, and the vehicle 20 can comprise a removable or affixed trailer jack or other connector to enable the vehicle 20 to be hitched or connected in a conventional manner to an automobile, motorcycle, or other motorized vehicle for pushing or pulling to a selected destination such as from a storage area for the vehicle to a body of water.

ADDITIONAL ALTERNATIVE EMBODIMENTS AND EXAMPLE APPLICATIONS

In the illustrative embodiment, the operator of the vehicle 20 is suspended from 4 points via bars 68, 70 that are connected to the front and rear crossbeams 34, 38. These bars 68, 70 and crossbeams 34, 38 suspend the operator and the hardware utilized in the propulsion system. In an alternative embodiment for suspending or supporting both the operator and the propulsion system, the vehicle 20 can have only a front crossbeam 34, but no rear crossbeam 38. In another alternative embodiment for suspending or supporting both the user and the propulsion system, the vehicle 20 can have a rear crossbeam 38, but no front crossbeam 34. In yet another alternative embodiment, the vehicle 20 can have no crossbeams 34, 38 in front or behind the user or operator (e.g., front and rear bars 68, 70 configured to support the propulsion system). Alternatively, the user and the entire propulsion system can be supported with just one crossbeam 34 and corresponding pair of bars 68 connected via conventional hardware. Additionally, the propulsion system need not be suspended at all, but rather connected to the frame 22 at the relative level of the wheels 52, 54 and pontoons 46. In another alternative embodiment, the foot platforms 74 can slide, glide, pivot or rotate on some type of rail, rack, or bar mechanism, as well as swing freely, or any combination thereof The illustrative embodiment described above primarily references walking as the means of propulsion. However, the illustrative embodiment can be engaged in such a manner that jogging or running is also possible.

The illustrative embodiment shows that the pins 50 on both sides 24 of the frame 22 are primarily used for the mounting of the pontoons 46 and the wheels 52, 54. In an alternative embodiment and with additional conventional hardware and materials, a user can place a rack on the pins 50. The vehicle 20 could then be used to transport many items. Examples would include transporting other people, transporting groceries from the store to home, transporting a cooler and/or tackle box and fishing gear, transporting paddle-boards from your car to the water, and transporting tools to a job site. Additionally, for greater transport, the rack could be placed at the front end 26 or rear end 28 of the vehicle 20.

The illustrative embodiment pictures a single operator vehicle 20. In an alternative embodiment, by duplicating hardware, multiple users can be accommodated on the vehicle 20 either side by side or front and back or any variation thereof. In addition, the transport member 44 can be dimensioned to accommodate a single 4-point racking system 68, 70, 72, 74, 84 for "Swing-Step-Strike" (SSS) motion by as user as described herein, and another user operating a stand up paddle, or mountable rowing oars, or freestanding canoe or kayak oars, or other mode of water propulsion.

In the illustrative embodiment, there is no reference to parking or keeping the vehicle 20 still on land, ice, or snow to prevent it from rolling or moving. Conventional hardware can be provided to position the depressors 84 to keep the strikers 90 of the paddles 72 engaged or depressed on to the surface so that there is no movement, in essence the vehicle 20 is parked.

In the illustrative embodiment, the paddles 72 are extended and retracted by the user's feet. In an alternative embodiment, the paddles 72 can be retracted and extended by a rod connected to the depressors 84 and the user facing backwards with his feet on the foot platforms 74 and using his arms to move the rods up and down and back and forth, which pushes the depressors 84. This action coordinated with legs to move the foot platforms 74 back and forth will give propulsion.

In the illustrative embodiment, the paddles 72 are brought into the retracted position by an elastic material connected above on the rear crossbeam 38 of the frame 22. In an alternative embodiment, the paddles 72 could be brought to that same retracted position by a rubber stop or other conventional material from underneath the depressors 84 pushing up as opposed to pulling up.

In the illustrative embodiment's the operator is suspended by hardware that includes front poles 32 and rear poles 36. In an alternative those poles 32, 36 could be wire or chain or another rigid or non-rigid conventional material used for suspending items.

In the illustrative embodiments, the user faces forward with some portion of his foot on the depressors 84 or foot platforms 74. In an alternative embodiment, the user can face to the rear end 28 of the vehicle 20, and sit or stand, and based on a range of movement combinations move the vehicle 20 forward or backward by pushing the depressors 84.

In the illustrative embodiments, the front crossbeam 34 and rear crossbeam 38 are not padded. However, because the vehicle 20 can operated ergonomically by sitting on either crossbeam 34, 38 in an alternative embodiment material like foam or other conventional cushion or seat material could easily be placed on front and/or rear crossbeams 34, 38 to allow the user to comfortably sit facing forward or backward.

In the illustrative embodiments, pontoons 46 are referenced for water usage and wheels 52, 54 for land usage. In an alternative embodiment, skis or sled blades or other conventional hardware could be used for ice or snow. In all cases, the hardware required to enable a land, water, snow, or ice version can be used individually or in conjunction with corresponding hardware. This allows a user the possibility to traverse multiple surfaces with minimal or no hardware adjustments. The interchangeability of the hardware includes, but is not limited to, the pontoons 46, wheels 52, 54, and rudder 54 from the illustrative embodiment.

In the illustrative embodiments, pontoons 46 are attached to the sides 24 of the frame 22 by cylinders going through holes 48 in the pontoon 46 or by directly being attached to the top of the pontoons 46. In an alternative embodiment, any pontoon 46 or flotation device can be tied or strapped to the frame 22 using conventional hardware.

In the illustrative embodiments, the wheels 52, 54 are exterior to the frame 22 and interior to pontoons 46. In an alternative embodiment, wheels 52, 54 can be any combination of interior or exterior to frame 22, parallel to each other or offset from each other.

In the illustrative embodiments for water use, there are two parallel pontoons 46 displayed. In an alternative embodiment and as stated above, the vehicle 20 can be a single hull or multi-hull vehicle, that is, any configuration that achieves the necessary buoyancy.

In the illustrative embodiments, there is a paddle 72 including a fin-shaped oar 88 and a striker 90 referenced or shown as the striking mechanism to the surface. However, alternative embodiments can contain any combination of a fin-shaped oar 88 only, a striker 90 only, or an oar 88 paired with a striker 90.

In the illustrative embodiments, much of the supporting hardware is referenced as "tubular" and illustrated as round. In an alternative embodiment, the shape of the frame 22 could be square or other cross-section shape.

In the illustrative embodiments, the joystick 62 is used to turn the rear wheels 54 or a rudder 54 located at the rear end 28 of the frame 22 of the vehicle 20. In an alternative embodiment, the joystick 62, with cable 64, is used to operate both wheels 52, 54 or a rudder in the front of the vehicle, even wheels 52 at the front end 26 of the frame 22 and a rudder 54 at the rear end 28 of the frame 22 simultaneously. Additionally, in a land only version, the vehicle 20 can have front-wheeled steering, that is, a steering wheel or handlebars similar to that of any 2, 3 or 4-wheeled bicycle or other vehicle.

Figure 3:
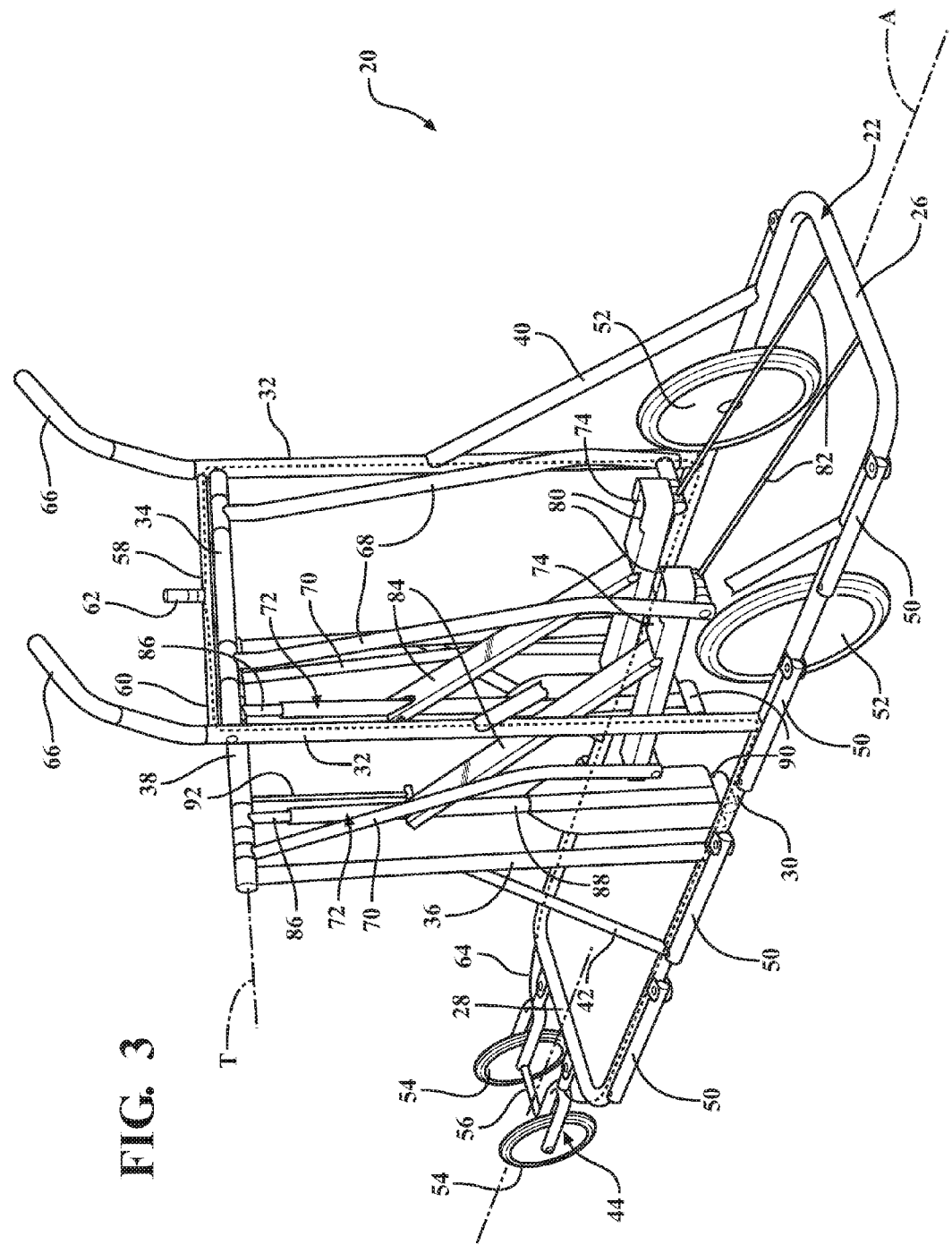
FIG. 3 is a perspective view of the vehicle showing the frame without the pontoons.

The present invention relates to the self-propelled motion of a vehicle 20 using a mechanical configuration described above. The mechanical configuration is platform technology allowing for broad motion applications in multiple fields. A watercraft configuration example is illustrated herein (e.g., FIG. 14). A water and land configuration is also described (e.g., FIG. 4). In addition, a land-only configuration is described (e.g., FIG. 3). Interestingly, while unique embodiments for different surfaces can require some modifications to the broader framework described herein, the base or core propulsion technology is the same.

In other words, aspects of the illustrative embodiments of the present invention allow a rider or driver to mount a 4-point, suspended, swinging racking system 68, 70, 72, 74, 84 and move forward and backward by a motion similar to walking. The racking system 68, 70, 72, 74, 84 and mechanical hardware described herein is designed to ergonomically mimic the walking motion when acted upon by the user. In its simplest form, walking consists of a relatively stationary or planted leg which gives resistance and stability to allow the opposite leg to raise up, swing forward or backward, and then step down. The process then repeats itself with the other leg. This racking system 68, 70, 72, 74, 84 when acted upon by the operator mechanically mimics much of that same process and will be hereinafter be identified as a "Swing-Step-Strike" motion or S.S.S. Motion.

Swing:

The user is able to freely swing her legs because the user is suspended on a frame 22 by 4 points or hinges which have free range of motion back and forth (one direction) and the racking system 68, 70, 72, 74, 84 is secured by being connected to the larger vehicle 20 be it wheels, pontoons, etc. The same swing of the leg in walking can be followed or mimicked by the swing of a foot platform 74. Similar to the way a porch swing swings back and forth.

Step:

The use of bungee cords 92 or springs 96 allows the depressor 84 to stay against your foot as you raise and lower either your heel or your entire foot to move. The spring 96 tension ensures that as you step up and down and move your legs the necessary components stay with your feet so that when you step down you are actuating the mechanics.

Strike:

With the step motion, you are transferring weight or pushing the depressor 84. This depressor 84 is connected to the paddle 72. Consequently, the swing and then step causes the mechanical foot to strike the matter below you. The matter will give resistance and the resistance will allow you to move the other leg in a similar manner.

It is this "swing-step-strike" motion that allows a user to propel herself through water when the vehicle 20 is configured, for example, as a buoyant watercraft. In the watercraft embodiment of the present invention, the paddles 72 pierce the surface of the water a few inches or so in terms of depth, giving the necessary resistance to swing the other leg while pushing the vehicle 20 forward. The resistance is similar to that experienced while paddling a canoe. It is the same S.S.S. motion that allows a user to enjoy motion on the street (e.g., engaging the wheels 52, 54 of the vehicle 20 as described herein). In this case, the modification to the embodiment would be a striker 90 that may be a rounded piece of rubber that would "grip" the street, giving you the necessary resistance and allowing you to move your other foot forward and roll along with the necessary 3 or 4 wheels that would be contacting the street. The resistance has similarity to a scooter or skateboard where the user swings the leg and strikes the surface with the foot to push the vehicle 20 forward. Respectively, for snow or sand, you might have a "scoop" like mechanical striker 90 with skis being the medium that allows you to navigate the terrain. Finally, ice might have a steel teeth-like striker 90 to bite into the ice with skis or a toboggan-type structure being the weight bearing medium. There are substantial variations all using the S.S.S. Motion for propulsion.

The striker 90 of the paddle 72 can be depressed by the depressor 84 hardware using multiple methods. This is especially true because an ergonomically comfortable motion can achieve propulsion by facing either frontward or backward and going forward or backward and either sitting or standing. This variations means the depressor 84 might be engaged by using just the heel of the foot, just the ball of the foot, the entire foot, or some variation or combination. Additionally, by use of connecting rods that go up to the hands, the arms and hands can be used to press the depressor 84 up and down and still give you thrust.

Aspects of the vehicle 20 described in accordance with illustrative embodiments of the present invention offer an advantageous array of exercise and movement options, yet utilize a virtual absence of gears, linkages or similar hardware. The simplicity of form and function of illustrative embodiments of the present invention allow the user to have an experience much more like a simple kayak or Stand Up Paddle-board than a more complicated new contraption for motion. Additionally, repairs remain very minimal. In addition, the 1-to-1 (1:1) motion to movement ratio that provides for propulsion and steering creates therefore also provides for the sensation of simple organic and dynamic movement as well as allowing the operator to have the feeling of tremendous control. For example, while a great many factors can influence speed (e.g., terrain, wind, etc.), an average person actuating a water configuration of the vehicle 20 can, at an average pace, go about 2 to 2.5 miles per hour which is by comparison similar to the average speed that people walk and similar to an average kayaking and canoeing speed.

Another advantage of the present invention is that the size and pole configuration allow the vehicle 20, with the right accessories, to transform quickly and easily into a floating or anchored tent, or an onshore tent (i.e., when using the wheels). Unlike pontoon boats, the vehicle 20 can be partially disassembled to a smooth surface ideal for sleeping. This occurs by taking a trampoline like material and stretching it across the base framing after removing the propulsion system from the crossbeams 34, 38 and storing them in or on the pontoons 46. Concurrently, some of the existing racking system 68, 70, 72, 74, 84 would double as support poles for the tent.

The vehicle 20 has many advantages over traditional watercraft such as a canoe, a kayak, and a Stand-Up Paddleboard (SUP), which are hereafter generally referred to as a Self-Propelled Watercraft (SPPW) category. For example, as discussed below, devices in the SPPW category have significant shortcomings in terms a number of factors such as Ergonomics, Stamina, Learning Curve, Water-Free Entry, Seasonality, Visual Enhancement, Demographic appeal, and 360 Degree Walking when compared to the vehicle 20.

With regard to Ergonomics, current offerings in the SPPW category all have some physical challenges that exceed that of vehicle 20. Kayak users are subjected to an awkward 90 degree bend at the waist while operating the vessel that contributes to making both water entry and exit difficult. Further, remaining in such an awkward position is uncomfortable for kayaking over long periods of time. A canoeist can have a more natural sitting position than a kayaker, but canoe paddling can be awkward, particularly if you are alone. Using a SUP can require a user to adopt a difficult and awkward forward-leaning stance and can present balance challenges. Additionally, unless you have achieved a high skill level with an SUP, any turbulent conditions can cause the user to fall off the SUP and into the water. By contrast, the vehicle 20 is advantageous over all of these craft in the SPPW category because it allows a user to stand or sit in comfort, remain balanced and supported out of the water during water use, and the user can move his legs to operate this vehicle and avoid awkward wrist positions.

Regarding Stamina, the propulsion of almost all craft in the SPPW category is the arms using a paddle in some type of paddling motion. Fatigue can set in quickly for an untrained or unfit person. However, with the vehicle 20, propulsion is primarily driven by the legs. The legs are the strongest muscles in the body, and the vehicle 20 facilitates a normal walking motion. Walking via the vehicle 20 allows for moving two paddles instead of having to use one's arms for kayaking and canoeing. As a result, a person can be on the water with the vehicle 20 for a substantial amount of time without experiencing substantial fatigue even without any advance training or preparation.

Regarding learning curve, almost all of the current offerings for commercially available watercraft in the SPPW category have a longer learning curve than the vehicle 20 because walking is something that most people are doing every day and throughout the day. Further, because the water-walking skill set (e.g., S.S.S. Motion described above) replicates regular walking so closely, the learning required by the user to use the vehicle 20 is quite minimal.

Regarding water-free entry, under normal circumstances where a user's water entry is from a shoreline (e.g., by a lake, river, etc.), the current SPPW category offerings will typically require a user get his feet wet. This is because you generally cannot position the traditional SPPW category craft in deep enough water for it to be off the shore without standing in the water. Dry entry from land to water is a significant advantage of vehicle 20. When you are on the vehicle 20, its paddles are striking the shore, allowing you to transfer most of your weight to the ground and then "inch" or "walk" the vehicle 20 (i.e., a vehicle 20 configured with pontoons 46 or other flotation device(s) for water use) out to a navigable depth in the water.

Regarding Seasonality, in locations with four seasons like such as in the mid-Atlantic region of the United States and geographic locations parallel or further north of there, you have a fairly limited boating or SPPW category season. The season is normally about 3 months, that is, June, July and August. The vehicle 20, however, advantageously expands that seasonality to about 8 months from about mid-March to mid-November. First, because the vehicle 20 keeps the user out of the water, even during land to water entry, the user is not subjected to cold water temperature discomforts, unlike people using traditional SPPW category craft who do not use their craft outside of the traditional boating season because they want to avoid getting wet. In addition to cold water temperatures, air temperature can be uncomfortable outside of traditional boating season. However, because the vehicle 20 provides a standing aerobic activity similar to walking or jogging, you create enough body heat for comfortable water navigation throughout about 8 months of the year as opposed to only 3 months of the year.

Regarding visual enhancement, two of the three main crafts in the SPPW category (e.g., kayak, canoe) require the user to be in a seated position during use of the watercraft. Standing up on the water as opposed to sitting down, as permitted by the vehicle 20, greatly increases visual enjoyment as the sight lines are much better. In addition, the vehicle 20 allows you to completely turnaround comfortably and safely.

Regarding demographic expansion, the current offerings of SPPW category craft are predominantly used by young people between the ages of 15 and 40 due to the above-identified shortcomings of current offerings in the SPPW category, that is, strength levels needed, balance challenges, temperature discomforts, ergonomic awkwardness, and learning curve. However, because you are basically just walking (a common and favorite leisure activity of those between the ages of 40 and 80), the vehicle 20 is suitable for a greater age range of users (e.g., ages 40 and up) and users having lesser degrees of stamina and/or balance and/or flexibility.

Regarding 360 degree walking, two of the three SPPW category craft mentioned above have no walkability (e.g., canoe and kayak), while the SUP has very limited walkability. The vehicle 20 advantageously achieves walkability with the pontoons 46, which can comprise an outer shell made of a rigid material such as fiberglass, wood, or plastic. The top of the pontoon 46 can be covered with non-slip material that allows the user to move from the operating location (e.g., in the center of the frame 22) and walk on the pontoons 46 and around the vehicle 20. This 360 degree walkability makes the vehicle 20 very easy to dock by a pier or on shore, and navigate obstacles. Further, because of the walkability of the pontoons 46, it would not be difficult to stand on one or both pontoons 46 and paddle while standing up as is done on an SUP.

The vehicle 20 has many advantages over traditional landcraft such as a 2-wheeled peddle bikes, 2 or 3-wheeled walking bikes, elliptical bikes and the like, which are hereafter generally referred to as a Self-Propelled Land vehicle category (SPLV) category. For example, in terms of weight transference, once you mount traditional craft in the SPLV category, most of them bear all of your weight continuously. As a result, all motion requires energy necessary to move both operator and equipment at full weight. The land configuration of the vehicle 20, on the other hand, displaces a fair amount of your weight from the vehicle 20 to the ground during use, which assists in your ability to move the vehicle 20 on both level terrain and when going up a hill or traversing rough terrain.

The propulsion system of the vehicle 20 makes it advantageous over the traditional propulsion system of, for example, a typical wheeled vehicle that the operator mounts and which transfers the operator's energy (e.g., typically thru pedaling) via a mechanical linkage to rotate tires to create motion. In the case of the land version the vehicle 20, the wheels 52, 54 only need to act as the medium for motion. Actual propulsion is generated by the swing-step-strike motion and configuration described above. This is particularly advantageous when navigating terrain wherein conventional landcraft propulsion and wheels might slip (e.g., in mud, ice, snow, sand, and watery environments). By contrast, the paddles 72 of the vehicle 20 can be equipped with the oars 88 or strikers 90 that offer superior traction.

While the current offerings in the SPLV category typically have 2 or 3 wheels, the vehicle 20 can be equipped with 4 wheels 52, 54. Additionally, flexibility exists for the 4 wheels to be configured in different ways and at different points in accordance with different illustrative embodiments to further increase stability.

The unique 4-wheeled standing vehicle 20 propelled by walking motion (e.g., S.S.S. motion) offers options for numerous applications that current water or land craft cannot. The stability and ease of motion and handling and load bearing characteristics make the vehicle 20 suitable and advantageous for use on a golf course, for example, for one or two operators to carry themselves and their golf clubs. The vehicle 20 is also suitable as a painter's platform, allowing a painter to move himself and his paint and tools comfortably. Additionally, the vehicle 20 can be useful in other residential, commercial or industrial applications such as in facility maintenance, or in medical applications for injured or special needs users, or military applications, and so on.

The vehicle 20 realizes a number of other advantages over water or land exercise equipment. For example, because the pontoons 46 can be connected to the frame 22 in an advantageous manner as described above (e.g., by sliding a plurality of pins 50 from the frame 22 through the pontoon 46), potential impediments or obstacles to walking on the top of the pontoons 46 can be obviated. In addition, the vehicle 20 realizes a degree of buoyancy interoperability whereby you can easily mount and dismount the pontoons 46 from the frame 22 of the vehicle 20. For example, the pins 50 mounting previously discussed for pontoon 46 attachment creates the possibility of interoperability with other watercraft or pontoons, such as using the pins 50 on each side 24 of the frame 22 to attach homemade pontoons or kayaks, a SUP, or canoes to each side.

No currently available SPPW category offerings allow a user to stand and use legs while white water rafting. In an embodiment of the vehicle 20 where the pontoons 46 are rubberized or even configured like a watercraft having a u-shaped front, the vehicle 20 provides the opportunity for outstanding and stable white-water rafting because of the wider base offered by double hull design. As mentioned above, the vehicle 20 can have a mono-hull design, the dimensions of which can be selected depending on the application (e.g., white-water rafting or flat-water use), the number of users on the vehicle 20, and the buoyancy required therefor. Additionally, by standing up, your legs becomes the "springs" or "shock absorbers" for your fast descents or falls and bumps while white-water rafting, as opposed to a seated or kneeling position as is the case on a kayak, raft, or canoe. Because the white-water version of the vehicle 20 can be outfitted with a supplemental steering mechanism, you would be able to steer with enough agility and precision to navigate the rapids.

Because of balance and stability issues, the current SPPW category options do not make great fishing choices. However, the standing position, the overall stability, and the excellent 360 degree walkability of the vehicle 20 make it an excellent choice for fishermen. Additionally, because propulsion comes from your feet, you can comfortably cast and hold your rod and then reel in the big fish without a lot of awkward angles or challenging balance situations. Finally, ample storage space available on the frame 22 and pontoons 46 and a walking pace of about 2 mph makes the vehicle 20 an excellent choice for fishermen who want to anchor, drift, or troll fish.

In accordance with an alternative embodiment of the present invention, the vehicle 20 can be configured with plural components of the propulsion system to accommodate two users, for example, or more users. As with SPPW category offerings such as a paddleboat or multiple user kayak or canoe, people often like to be on the water with others and sometimes in the same watercraft. A tandem vehicle 20 configuration minimally increases the overall size and weight of the vehicle 20 with the tandem vehicle 20 configuration being wider, but not necessarily longer to accommodate side by side depressors 72 and their corresponding components.

The vehicle 20 can also be configured with at least one shaft to create a framework for a small sail-like structure to increase speed, ease, and fun, depending upon weather conditions and wind direction.

In accordance with another advantage of the water configuration of the vehicle 20, the propulsion system of the vehicle 20 is not in the water when not acted upon to create movement and therefore the propulsion system does not create drag, making the vehicle 20 more hydrodynamic. In other words, only the pontoons 46 are engaged with the water when not acted upon to create movement.

In the illustrative embodiment, elastic type material 82 is connected to foot platforms 74 and the frame 22 to both provide resistance and to bring the foot platforms to an ideal location for walking or running. In an alternative embodiment, the tension and swing of the foot platform 82 could be controlled by conventional hardware attached and contained in the front crossbeam 34 to similar effect. An additional alternative embodiment can contain no tension mechanism against the foot platforms 82.

In the illustrative embodiment, the lost-motion connection of the propulsion bar 86 of the paddles 72 and the oar 88 of the paddles 72 includes the oar 88 of the paddles 72 being slidably disposed in the propulsion bar 86 of the paddles 72. In an alternative embodiment, the paddles 72 and the oar of the paddle 88 can be depressed without being slidably engaged having the current "tube within a tube" but rather freestanding, where the paddles 72 and the oar 88 are not directly connected through any hardware up to the rear crossbeam 38 but are connected by conventional hardware to the depressors 84.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

| ELEMENT LIST | |
|---|---|
| Element Symbol | Element Name |
| 20 | vehicle |
| 22 | frame |
| 24 | sides |
| 26 | front end |
| 28 | rear end |
| 30 | midpoint |
| 32 | front poles |
| 34 | front crossbeam |
| 36 | rear poles |
| 38 | rear crossbeam |
| 40 | front stabilizers |
| 42 | rear stabilizers |
| 44 | transport member |
| 46 | pontoons |
| 48 | holes |
| 50 | pins |
| 52 | front wheels |
| 54 | rear wheels |
| 56 | axle |
| 58 | steering column |
| 60 | guideway |
| 62 | joystick |
| 64 | cables |
| 66 | handles |
| 68 | front bars |
| 70 | rear bars |
| 72 | paddles |
| 74 | foot platforms |
| 76 | proximal end |
| 78 | distal end |
| 80 | rim |
| 82 | front cords |
| 84 | depressors |
| 86 | propulsion bars |
| 88 | oars |
| 90 | strikers |
| 92 | rear cords |
| 94 | slot |
| 96 | springs |

What is claimed is:

1. A vehicle (20) powered by the feet of a human for movement over a surface of water and land, said vehicle (20) comprising;
a frame (22) for movement along a body axis (A), the frame having two front poles (32) and two rear poles (36) extending vertically from the frame, the front poles (32) being spaced from the rear poles (36) along the body axis (A) which extends horizontally along the frame (22) between the front poles (32) and the rear poles (36), each of the two front poles (32) rotatably supporting a front bar (68) and each of the two rear poles (36) rotatably supporting a rear bar (70) to provide with frame with two front bars (68) and two rear bars (70),
at least one transport member (44) connected to said frame (22) for moving said vehicle (20) over the surface,
a pair of paddles (72) with each of said paddles (72) rotatably supported by a respective one of the rear poles (36) of said frame (22) for rotation about a transverse axis (T) extending horizontally and perpendicular to said body axis (A) to engage and propel said vehicle (20) over the surface,
a pair of foot platforms (74) with one of said foot platforms (74) rotatably connected to a front bar (68) and a rear bar (70) among the two front bars (68) and the two rear bars (70) and the other one of said foot platforms (74) rotatably connected to the other front bar (68) and the other rear bar (70), the pair of foot platforms (74) being operatively connected to each of said paddles (72) for rotating each of said paddles (72) relative to said frame (22) about said transverse axis (T),
each of said paddles (72) extending longitudinally from, and rotatably supported by, its corresponding one of said rear poles (36) of said frame (22) for swinging movement between an extended position engaging the surface and a retracted position moved vertically out of engagement with the surface,
each of said paddles (72) including a propulsion bar (86) and an oar (88) connected by a lost-motion connection with each of said propulsion bars (86) allowing each of said oars (88) of each of said paddles (72) to slide relative to each of said propulsion bars (86) of each of said paddles (72) between said extended position and said retracted position, and
a pair of depressors (84) with each of said depressors (84) interconnecting each of said foot platforms (74) and each of said oars (88) of each of said paddles (72) for rotating each of said propulsion bars (86) of each of said paddles (72) between said extended position and said retracted position by lowering each of said oars (88) of each of said paddles (72) downwardly and into engagement with the surface and raising each of said oars (88) of each of said paddles (72) upwardly and out of engagement with the surface.

2. A vehicle (20) as set forth in claim 1 wherein each of said oars (88) of each of said paddles (72) has a fin-shape to propel said vehicle (20) over water.

3. A vehicle (20) as set forth in claim 1 wherein each of said oars (88) of each of said paddles (72) includes a striker (90) with each of said strikers (90) having a rounded-shape extending from each of said oars (88) of each of said paddles (72) to propel said vehicle (20) over land.

4. A vehicle (20) as set forth in claim 1 further including a pair of rear cords (92) made of elastomeric material with each of said rear cords (92) attached to each of said depressors (84) adjacent each of said oars (88) of each of said paddles (72) and to said frame (22) tightening to provide assistance to each of said oars (88) of each of said paddles (72) moving from said extended position to said retracted position and stretching to provide resistance to each of said oars (88) of each of said paddles (72) moving from said retracted position to said extended position.

5. A vehicle (20) as set forth in claim 1 wherein each of said propulsion bars (86) of each of said paddles (72) presents a slot (94) with each of said slots (94) extending along each of said propulsion bars (86) of each of said paddles (72),
each of said depressors (84) extending through each of said slots (94) of each of said propulsion bars (86) of each of said paddles (72) to each of said oars (88) of each of said paddles (72),
a pair of springs (96) disposed in each of said slots (94) of each of said propulsion bars (86) of each of said paddles (72) and extending from said frame (22) to each of said oars (88) of each of said paddles (72) compressing to provide assistance to each of said oars (88) of each of said paddles (72) moving from said extended position to said retracted position and stretching to provide resistance to each of said oars (88) of each of said paddles (72) moving from said retracted position to said extended position.

6. A vehicle (20) as set forth in claim 1 further including a pair of rear cords (92) made of elastomeric material with each of said rear cords (92) attached to each of said depressors (84) adjacent each of said oars (88) of each of said paddles (72) and extending to said frame (22) tightening to provide assistance to each of said oars (88) of each of said paddles (72) moving from said extended position to said retracted position and stretching to provide resistance to each of said oars (88) of each of said paddles (72) moving from said retracted position to said extended position,
a pair of springs (96) with each of said springs (96) disposed in each of said propulsion bars (86) of each of said paddles (72) and extending from said frame (22) to each of said oars (88) of each of said paddles (72) compressing to provide assistance to each of said oars (88) of each of said paddles (72) moving from said extended position to said retracted position and stretching to provide resistance to each of said oars (88) of each of said paddles (72) moving from said retracted position to said extended position.

7. A vehicle (20) as set forth in claim 1 wherein each of said front poles (32) is perpendicularly connected to said frame (22) and being spaced between a front end (26) of said frame (22) and a midpoint (30) of said frame (22), and each of said rear poles (36) is perpendicularly connected to said frame (22) and being spaced between the midpoint (30) of said frame (22) and a rear end (28) of said frame (22).

8. A vehicle (20) as set forth in claim 1 further comprising a front crossbeam (34) extending between each of said front poles (32) of said frame (22) to define a u-shape.

9. A vehicle (20) as set forth in claim 8 further comprising a rear crossbeam (38) extending between each of said rear poles (36) of said frame (22) to define a u-shape.

10. A vehicle (20) as set forth in claim 9 wherein the paddles (72) can be rotatably connected to the rear crossbeam (38).

11. A vehicle (20) as set forth in claim 1 wherein said transport member (44) comprises one of a mono-hull, and a multi-hull arrangement, for moving said vehicle (20) over water.

12. A vehicle (20) as set forth in claim 11 wherein said transport member (44) has the multi-hull arrangement and includes a pair of pontoons (46) connected to the frame (22).

13. A vehicle (20) as set forth in claim 12, said pontoons (46) presenting a plurality of holes (48) with each of said holes (48) extending through each of said pontoons (46), and a plurality of pins (50) with each of said pins (50) having a cylindrical shape hingedly attached to respective sides (24) of said frame (22) and pivotally connected to each of said pontoons (46) through each of said holes (48) of each of said pontoons (46) to allow each of said pontoons (46) to be removed from said vehicle (20).

14. A vehicle (20) as set forth in claim 7 further comprising a pair of front wheels (52) attached to the frame (22) or transport member (44) and with each of said front wheels (52) having a circular shape, the front wheels (52) being spaced between said front end (26) of said frame (22) and said midpoint (30) of said frame (22) for moving said vehicle (20) over land, and having a radius extending further from said frame (22) than said transport member (44) to allow said vehicle (20) to move over land and seamlessly into water.

15. A vehicle (20) as set forth in claim 1, further comprising a pair of wheels having a circular shape that are one of affixed to and removably attached to the front, sides or rear of the transport member 44 or frame 22.

16. A vehicle (20) as set forth in claim 15 and the vehicle (20) can be pulled or pushed by another vehicle, wherein the frame (22) is configured with a connector for attachment to the other vehicle and transport on the pair of rear wheels.

17. A vehicle (20) as set forth in claim 7 wherein said transport member (44) further includes a pair of rear wheels (54) attached thereto with each of said rear wheels (54) having a circular shape pivotally attached to said rear end (28) of said frame (22) for turning and moving said vehicle (20) over water and land.

18. A vehicle (20) as set forth in claim 1 wherein each of said foot platforms (74) have a proximal end (76) and a distal end (78) with each of said proximal ends (76) of each of said foot platforms (74) pivotally connected to each of said bottoms of each of said front bars (68) and each of said distal ends (78) of each of said foot platforms (74) pivotally connected to each of said bottoms of each of said rear bars (70).

19. A vehicle (20) as set forth in claim 18 wherein each of said proximal ends (76) of each of said foot platforms (74) includes a rim (80) with each of said rims (80) having a c-shape for supporting the feet of the human on each of said foot platforms (74).

20. A vehicle (20) as set forth in claim 19 wherein each of the rims (80) is configured with a toe holder (81) disposed over an area defined by said rim to retain the feet of the human on each of said foot platforms (74).

21. A vehicle (20) as set forth in claim 20 wherein the toe holder (81) is at least one of a strap, a partial cover and a full cover.

22. A vehicle (20) as set forth in claim 20 wherein the toe holder (81) is adjustably mountable at different positions along a length of the corresponding foot platform (74) that is adjacent the rim (80).

* * * * *